United States Patent
Morita et al.

(10) Patent No.: US 11,480,743 B2
(45) Date of Patent: Oct. 25, 2022

(54) CONNECTOR, CONNECTOR SET, CABLE, AND ELECTRONIC APPARATUS

(71) Applicant: SONY CORPORATION, Tokyo (JP)

(72) Inventors: Hiroshi Morita, Kanagawa (JP); Kazuaki Toba, Kanagawa (JP); Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/960,133

(22) PCT Filed: Nov. 14, 2018

(86) PCT No.: PCT/JP2018/042067
§ 371 (c)(1),
(2) Date: Jul. 6, 2020

(87) PCT Pub. No.: WO2019/138683
PCT Pub. Date: Jul. 18, 2019

(65) Prior Publication Data
US 2021/0072470 A1    Mar. 11, 2021

(30) Foreign Application Priority Data
Jan. 15, 2018   (JP) .............................. JP2018-004270

(51) Int. Cl.
*G02B 6/32* (2006.01)
*G02B 6/38* (2006.01)
(Continued)

(52) U.S. Cl.
CPC ............. *G02B 6/4214* (2013.01); *G02B 6/32* (2013.01); *G02B 6/3825* (2013.01);
(Continued)

(58) Field of Classification Search
CPC ...... G02B 6/32; G02B 6/3849; G02B 6/3897; G02B 6/38125
(Continued)

(56) References Cited

U.S. PATENT DOCUMENTS 5,059,019 A * 10/1991 McCullough .......... G03B 17/06
                                                     352/131
7,657,147 B2    2/2010 Bonitatibus et al.
(Continued)

FOREIGN PATENT DOCUMENTS

CN        104991319 A       10/2015
CN        106483605 A        3/2017
(Continued)

OTHER PUBLICATIONS

International Search Report and Written Opinion of PCT Application No. PCT/JP2018/042067, dated Jan. 22, 2019, 17 pages of ISRWO.

(Continued)

*Primary Examiner* — Kaveh C Kianni
(74) *Attorney, Agent, or Firm* — Chip Law Group

(57) ABSTRACT

Provided is a connector that includes an optical component and a movable member. The optical component emits light. Light from the optical component is incident upon the movable member and the movable member is movable between a first state taken during non-fitting to a counterpart connector and a second state taken during fitting to the counterpart connector. Incident light incident upon the movable member from the optical component is, in the first state, attenuated and emitted to an outside such that power of the light is lower than power of the light when the movable member is held in the second state.

15 Claims, 15 Drawing Sheets

(51) Int. Cl.
*G02B 6/42* (2006.01)
*G02B 6/44* (2006.01)

(52) U.S. Cl.
CPC ......... *G02B 6/3849* (2013.01); *G02B 6/3874* (2013.01); *G02B 6/3897* (2013.01); *G02B 6/44* (2013.01)

(58) Field of Classification Search
USPC ........................................................ 385/15
See application file for complete search history.

(56) References Cited

U.S. PATENT DOCUMENTS

2004/0052473 A1* 3/2004 Seo ................. G02B 6/3849
385/73
2007/0206901 A1* 9/2007 Bonitatibus ............ F21S 8/006
385/48

FOREIGN PATENT DOCUMENTS

| CN | 107209332 A | 9/2017 | | |
|---|---|---|---|---|
| JP | 05-093821 A | 4/1993 | | |
| JP | 2002-055263 A | 2/2002 | | |
| JP | 2004-94109 A | 3/2004 | | |
| JP | 3597764 B2 | 12/2004 | | |
| JP | 5314208 B1 | 10/2013 | | |
| JP | 2015-036755 A | 2/2015 | | |
| JP | 2015-045666 A | 3/2015 | | |
| JP | 2017-026830 A | 2/2017 | | |
| JP | 2017026830 A | * | 2/2017 | |
| JP | 2017-058583 A | 3/2017 | | |
| JP | 6086045 B2 | 3/2017 | | |
| JP | 6283006 B2 | 2/2018 | | |
| RU | 2707243 C2 | * | 11/2019 | ........... G02B 6/4292 |
| WO | 2016/192170 A1 | 12/2016 | | |
| WO | 2017/056889 A1 | 4/2017 | | |

OTHER PUBLICATIONS

Office Action for CN Patent Application No. 201880085859.3, dated Apr. 24, 2022, 10 pages of English Translation and 08 pages of Office Action.

\* cited by examiner

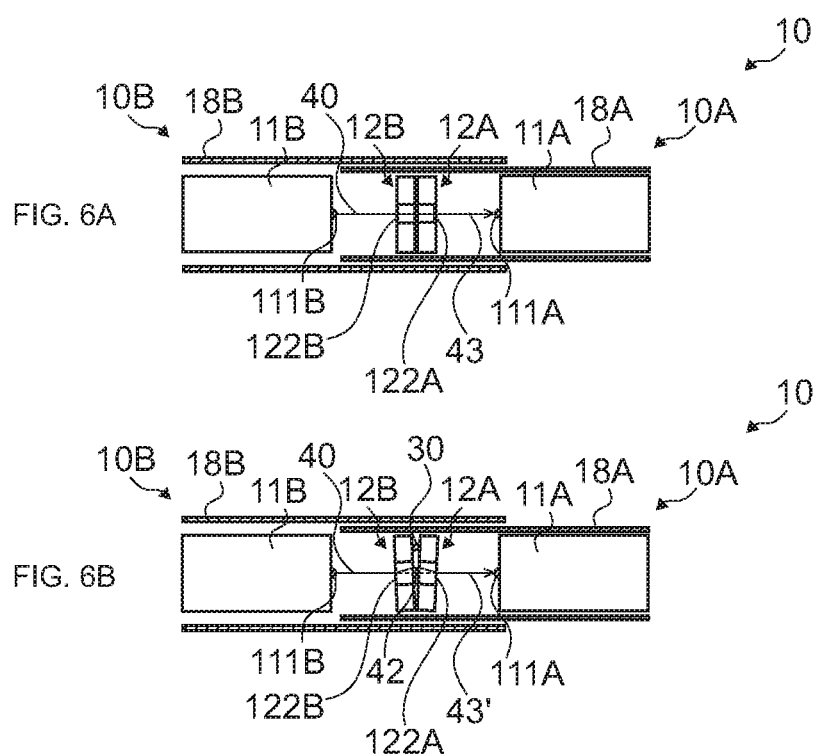

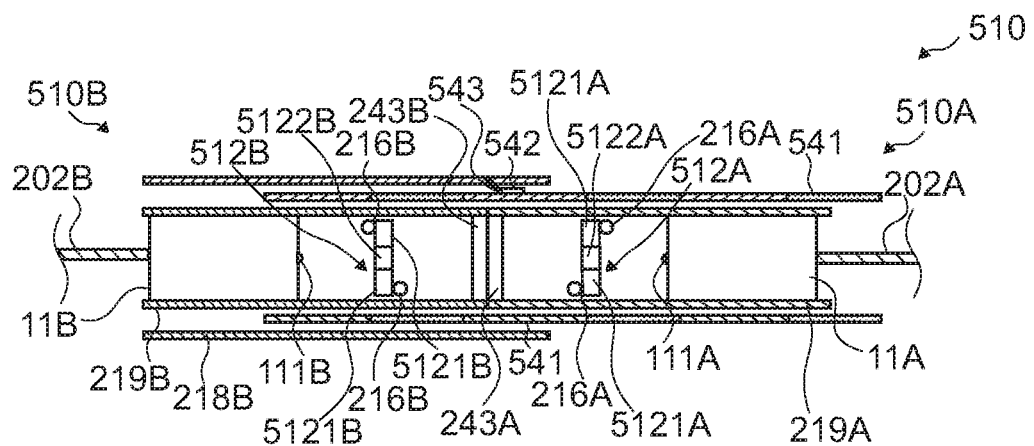
FIG. 17
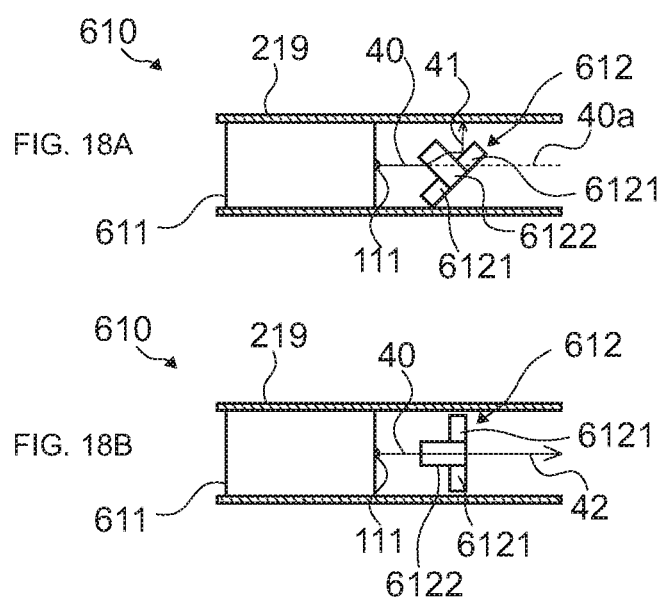
FIG. 18A
FIG. 18B

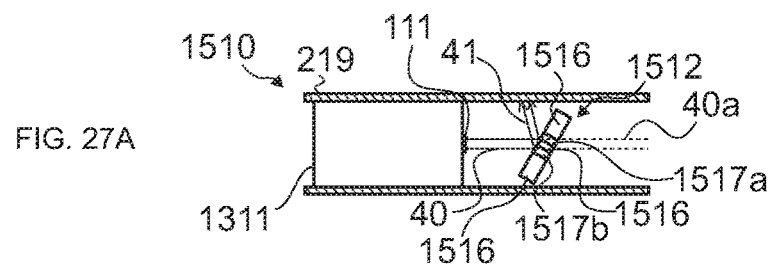
FIG. 27A
FIG. 27B
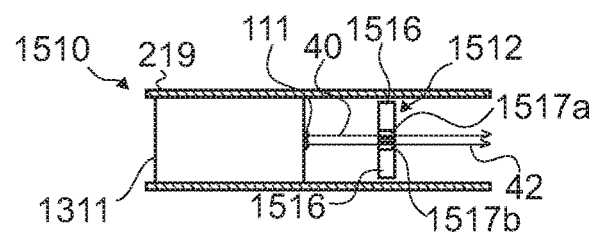
FIG. 28A
FIG. 28B
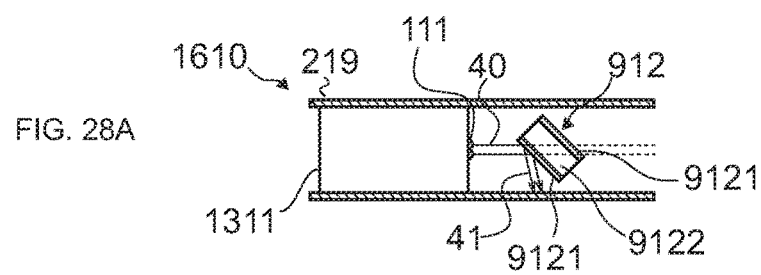
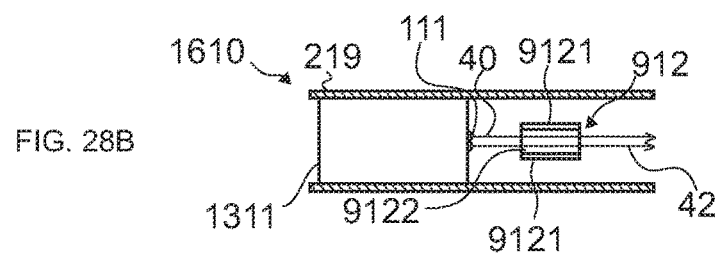
FIG. 29
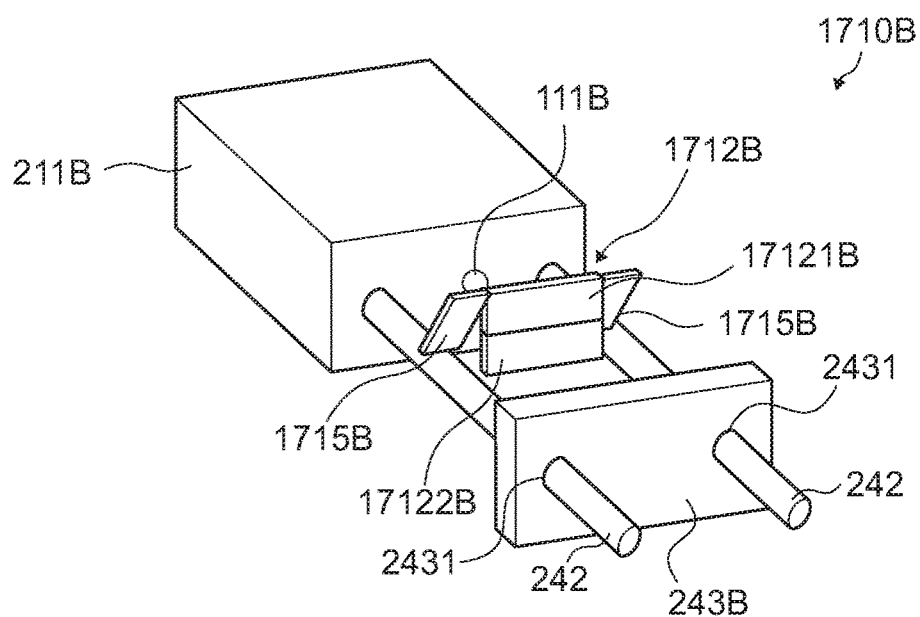

CONNECTOR, CONNECTOR SET, CABLE, AND ELECTRONIC APPARATUS

CROSS REFERENCE TO RELATED APPLICATIONS

This application is a U.S. National Phase of International Patent Application No. PCT/JP2018/042067 filed on Nov. 14, 2018, which claims priority benefit of Japanese Patent Application No. JP 2018-004270 filed in the Japan Patent Office on Jan. 15, 2018. Each of the above-referenced applications is hereby incorporated herein by reference in its entirety.

TECHNICAL FIELD

The present technology relates to a connector, a connector set, a cable, and an electronic apparatus used for optical data transmission.

BACKGROUND ART

Signal transmission using light has been more and more popular along with a sharp increase in communication traffic in recent years. A collimated light coupling method in which lenses are attached to ends of optical fibers such that optical axes are aligned, and optical signals as collimated light are transferred between the opposite lenses has currently been proposed.

The collimated light used in the collimated light coupling method is characterized in that the power of the light is principally hardly attenuated even at a long distance from an emitter. However, from the perspective of the safety, it is difficult to satisfy safety standards related to laser light in a manner that depends on its intensity. Therefore, an optical communication connector is currently provided with a shutter that shields collimated light during non-fitting.

Moreover, Patent Literature 1 has disclosed an optical communication connector including, for preventing collimated light from being directly emitted to the outside of an optical connector during non-optical coupling, a refracting section that refracts and emits light from an optical transmission path emitted from the collimating lens and a scattering section that scatters at least a part of the light emitted from the refracting section.

CITATION LIST

Patent Literature

Patent Literature 1: WO 2017/056889

DISCLOSURE OF INVENTION

Technical Problem

In view of the above-mentioned circumstances, it is an object of the present technology to provide a connector, a connector set, a cable, and an electronic apparatus having another configuration for preventing light from an optical transmission path from being directly emitted to the outside of an optical connector during non-optical coupling.

Solution to Problem

In order to accomplish the above-mentioned object, a connector according to an embodiment of the present technology includes an optical component and a movable member.

The optical component emits light.

Light from the optical component is incident upon the movable member and the movable member is movable between a first state taken during non-fitting to a counterpart connector and a second state taken during fitting to the counterpart connector.

Incident light incident upon the movable member from the optical component is, in the first state, attenuated and emitted to an outside such that power of the light is lower than power of the light when the movable member is held in the second state.

With that configuration, light emitted to the outside of the connector during non-fitting can be attenuated by the movable member. Accordingly, the light emitted to the outside of the connector can be adjusted down to the level according to safety standards.

The movable member may include a non-light-transmissive portion that does not allow the incident light to pass therethrough and a light-transmissive portion that allows the incident light to pass therethrough, the incident light may be incident upon the non-light-transmissive portion in the first state, and the incident light may be incident upon the light-transmissive portion in the second state.

With that configuration, by the movable member taking the first state, the power of light emitted to the outside of the connector is attenuated by the non-light-transmissive portion.

The non-light-transmissive portion may reflect the incident light and the connector may further include a scattering portion that scatters at least a part of the light reflected on the non-light-transmissive portion or an absorption portion that absorbs at least a part of the light reflected on the non-light-transmissive portion.

The non-light-transmissive portion may absorb the incident light.

The non-light-transmissive portion may scatter the incident light.

The movable member may refract and emit, in the first state, incident light obliquely to the optical axis of the incident light and emit, in the second state, the incident light to be aligned with the optical axis of the incident light or emit the incident light to be parallel to the optical axis of the incident light and the connector may further include a scattering portion that scatters at least a part of the light refracted by the movable member and emitted from the movable member or an absorption portion that absorbs at least a part of the light refracted by the movable member and emitted from the movable member.

With that configuration, by the movable member taking the first state, incident light incident upon the movable member from the optical component is emitted to be oblique with respect to the optical axis of the incident light. The power of light emitted to the outside of the connector is thus attenuated.

The movable member may have a frustum shape.

The connector may further include an electromagnet that generates magnetic force during fitting to the counterpart connector, and the movable member may include a movable magnet absorbable to the electromagnet.

With that configuration, the movable member can be made movable by the electromagnet.

The movable member may be configured to be rotatable.

The connector may further include: a rotation shaft that supports the movable member to be movable between the first state and the second state; and an urging member that urges the movable member in a direction to move from the second state to the first state.

With that configuration, the movable member can be configured to be capable of taking the first state and the second state by being rotated.

The connector may further include: an elastic member that is fixedly disposed on the optical component and is capable of extending and contracting in an insertion direction of the counterpart connector; and a pin that is capable of being brought into contact with the movable member and protrudes from the optical component, the pin having a length of protrusion from the optical component, the length of protrusion changing due to extension and contraction of the elastic member.

With that configuration, in the connector, the elastic member is extended and contracted due to fitting to the counterpart connector and the length of protrusion of the pin from the optical component changes due to this extension and contraction of the elastic member. The distance between the pin protruding from the optical component and the movable member is shortened due to the elastic member provided in a contraction state and the pin is brought into contact with the movable member and pushes the movable member. The movable member can be thus rotated and moved from the first state to the second state. In such a configuration, the configuration of the counterpart connector is not brought into direct contact with the movable member of the connector and the movable member can be rotated by a connector's own inside mechanism.

The connector may further include: a hole into which a pin of the counterpart connector is inserted; and a rotation-assisting plate fixed to the movable member. The rotation-assisting plate may be moved and the movable member may be moved from the first state to the second state by inserting the pin into the hole.

With that configuration, the movable member can be rotated and moved from the first state to the second state by insertion of the pin of the counterpart.

The connector may further include: a pin that is inserted into a hole of the counterpart connector and is movable in an insertion direction; and a rotation-assisting plate that moves due to insertion of the pin into the hole and causes the movable member to move from the first state to the second state with the movable member interlocked with the movement.

With that configuration, the pin of the counterpart connector is inserted into the hole, such that the movable member can be rotated and moved from the first state to the second state.

The pin may be a positioning pin that positions the connector and the counterpart connector.

By using a single pin for both movement and positioning of the movable member as described above, the number of components can be reduced and the range of design for the connector can be widened.

The movable member may be configured to be movable upward and downward.

In order to accomplish the above-mentioned object, a connector set according to an embodiment of the present technology includes a connector and a counterpart connector.

The connector includes an optical component that emits light and a movable member upon which light from the optical component is incident, the movable member being movable between a first state and a second state.

The counterpart connector is capable of fitting to the connector.

The movable member of the connector takes the first state during non-fitting of the connector to the counterpart connector and takes the second state during fitting and incident light incident upon the movable member from the optical component is, in the first state, attenuated and emitted to an outside of the connector such that power of the light is lower than power of the light when the movable member is held in the second state.

In order to accomplish the above-mentioned object, a cable according to an embodiment of the present technology includes an optical transmission path and a connector.

The connector includes a movable member upon which light from the optical transmission path is incident, the movable member being movable between a first state taken during non-junction with a counterpart connector and a second state taken during junction with the counterpart connector, in which incident light incident upon the movable member from the optical transmission path is, in the first state, attenuated and emitted to an outside such that power of the light is lower than power of the light when the movable member is held in the second state.

In order to accomplish the above-mentioned object, an electronic apparatus according to an embodiment of the present technology includes a connector.

The connector includes an optical component that emits light and a movable member upon which light from the optical component is incident, the movable member being movable between a first state taken during non-junction with a counterpart connector and a second state taken during junction with the counterpart connector, in which incident light incident upon the movable member from the optical component is, in the first state, attenuated and emitted to an outside such that power of the light is lower than power of the light when the movable member is held in the second state.

Advantageous Effects of Invention

As described above, in accordance with the present technology, light from an optical transmission path is attenuated and emitted to the outside of an optical connector during non-fitting, and thus the light emitted to the outside can be adjusted down to the level according to safety standards and the safety for optical junction work of the connector is enhanced. It should be noted that the effects described here are not necessarily limitative and any effect described in the present disclosure may be provided.

BRIEF DESCRIPTION OF DRAWINGS

FIGS. 6A and 6B A cross-sectional view for comparing a state in which foreign matter exists with a state in which foreign matter does not exist during fitting of the optical communication connector set in FIG. 1.

FIG. 17 A cross-sectional view showing a fitting state of the optical communication connector set in FIG. 16.

FIGS. 18A and 18B A cross-sectional view showing a modified example of a movable member according to a sixth embodiment.

FIGS. 27A and 27B A cross-sectional view showing a modified example of a movable member according to a fifteenth embodiment.

FIGS. 28A and 28B A cross-sectional view showing a modified example of a movable member according to a sixteenth embodiment.

FIG. 29 A schematic perspective view of an optical communication connector on the receptacle side according to a seventeenth embodiment.

MODE(S) FOR CARRYING OUT THE INVENTION

Hereinafter, embodiments according to the present technology will be described with reference to the drawings.

First Embodiment

[Outer Appearance Example of Electronic Apparatus and Optical Communication Cable]

Figure 1:
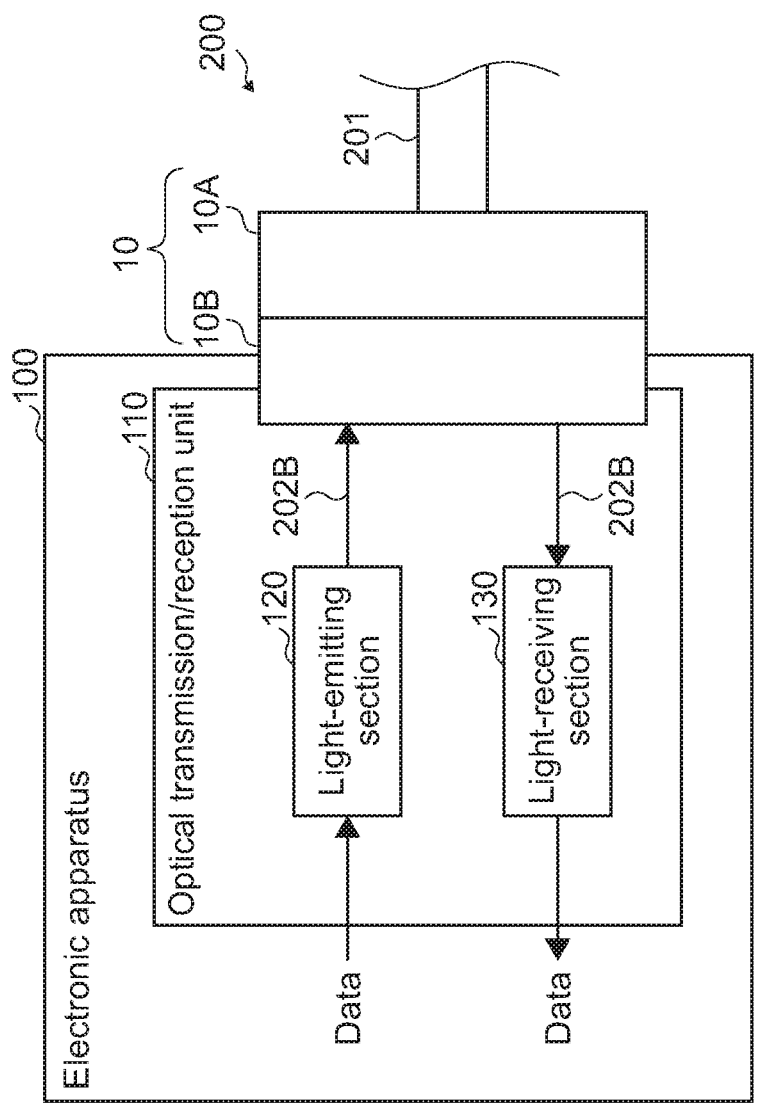
FIG. 1 A conceptual diagram showing configurations of an electronic apparatus and an optical communication cable according to a first embodiment of the present technology.

Referring to FIG. 1, an outer appearance example of an electronic apparatus 100 and an optical communication cable 200 according to this embodiment will be described.

As shown in FIG. 1, the electronic apparatus 100 includes an optical transmission/reception unit 110. The optical transmission/reception unit 110 is configured to be capable of optical communication. Moreover, the optical transmission/reception unit 110 is capable of transmitting data that the electronic apparatus 100 has to send as an optical signal via an optical communication connector 10B which is on the receptacle side and is also capable of receiving an optical signal to the electronic apparatus 100.

The optical communication cable 200 includes a cable main body 201 and an optical communication connector 10A that is on the plug side. The optical communication cable 200 transmits an optical signal between the electronic apparatus 100 and another electronic apparatus or a communication network such as the Internet via the cable main body 201 and the optical communication connector 10A that is on the plug side.

The optical communication connector 10A and the optical communication connector 10B are configured to be capable of being fitted to each other. The optical communication connector 10A and the optical communication connector 10B constitute an optical communication connector set 10. The optical communication connector 10A is a counterpart connector, which is a fitting counterpart and is also an optical junction counterpart for the optical communication connector 10B. Similarly, the optical communication connector 10B is a counterpart connector, which is a fitting counterpart and is also an optical junction counterpart for the optical communication connector 10A.

In a case where the electronic apparatus 100 is a sender apparatus, an optical component 11B of the optical communication connector 10B, which will be described later, constitutes an optical output unit and an optical component 11A of the optical communication connector 10A, which will be described later, correspondingly constitutes an optical input unit.

On the other hand, in a case where the electronic apparatus 100 is a receiver apparatus, the optical component 11B of the optical communication connector 10B constitutes an optical input unit and the optical component 11A of the optical communication connector 10A correspondingly constitutes an optical output unit.

It should be noted that the electronic apparatus 100 can be a mobile electronic apparatus such as a mobile phone, a smartphone, a PHZ phone, a PDA, a tablet PC, a laptop computer, a video camera, an IC recorder, a mobile media player, an electronic organizer, an electronic dictionary, an electronic calculator, a mobile video game console, or may be an electronic apparatus such as a desktop computer, a display apparatus, a television receiver, a radio receiver, a video recorder, a printer, a car navigation system, a game console, a router, a hub, or an optical network unit (ONU), for example. Alternatively, the electronic apparatus 100 can constitute all or a portion of a vehicle or an electrical machine such as a refrigerator, a washing machine, a clock, a doorphone, an air conditioner, a humidifier, an air purifier, lighting equipment, or a cooking appliance.

[Configuration of Optical Communication Connector]

Next, configurations of the optical communication connectors 10A and 10B that constitute the optical communication connector set 10 will be described with reference to FIGS. 2 to 4 as well as FIG. 1. The optical communication connector 10A and the optical communication connector 10B have the same configuration except for a difference in size of first outer wall portion that constitutes a part of each of them.

Figure 2:
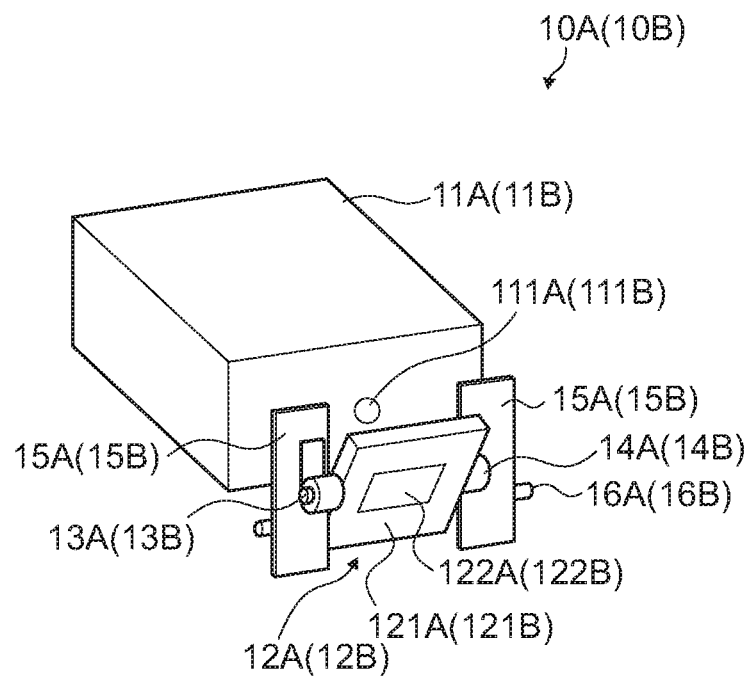
FIG. 2 A schematic perspective view of an optical communication connector in FIG. 1.

FIG. 2 is an enlarged schematic perspective view of the optical communication connector 10A (10B) shown in FIG. 1 and the illustration of the first outer wall portion is omitted. FIG. 3 is a schematic cross-sectional view showing a state during non-fitting of the optical communication connector set 10 shown in FIG. 1. FIG. 4 is a schematic cross-sectional view showing a state during fitting of the optical communication connector set 10.

As shown in FIG. 1, the optical communication connector 10A is a plug provided on the side of an end of the cable main body 201 and the optical communication connector 10B is a receptacle provided on the side of the electronic apparatus 100.

Figure 3:
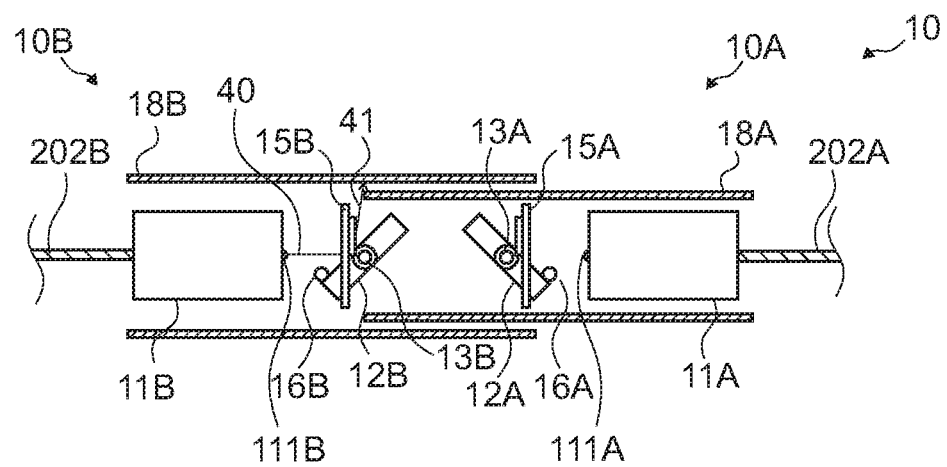
FIG. 3 A cross-sectional view showing a non-fitting state of the optical communication connector set in FIG. 1.
Figure 4:
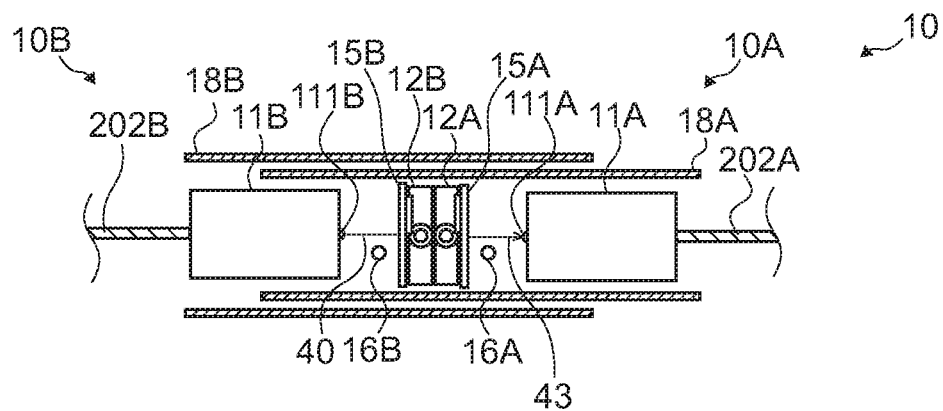
FIG. 4 A cross-sectional view showing a fitting state of the optical communication connector set in FIG. 1.

As shown in FIGS. 2 and 3, the optical communication connector 10A (10B) includes a first outer wall portion 18A (18B), an optical component 11A (11B), a movable member 12A (12B), a movable member-rotating shaft 13A (13B), springs 14A (14B), spring-fixing portions 15A (15B), and stoppers 16A (16B).

It should be noted that the optical communication connector 10A (10B) can include a positioning member for positioning each member, a protection member for protecting each member, a casing for supporting each member, and the like as appropriate besides the above-mentioned configuration.

The first outer wall portion 18A (18B) include, in the figure, a pair of plate-like members respectively arranged above and below the optical component 11A (11B) while sandwiching the optical component 11A (11B).

A portion of the first outer wall portion 18A (18B), which is irradiated with light reflected on a reflective portion 121A (121B) of a movable portion 12A (12B) to be described later during non-fitting, is constituted by a scattering member. The first outer wall portion 18A (18B) functions as a scattering portion.

The first outer wall portion 18A (18B) is provided to sandwich the optical component 11A (11B), the movable member 12A (12B), the movable member-rotating shaft 13A (13B), the springs 14A (14B), the spring-fixing portions 15A (15B), and the stoppers 16A (16B) from above and below.

The first outer wall portion 18B includes, at one end thereof, an opening into which the optical communication connector 10A that is on the plug side is inserted. The first outer wall portion 18A is, at one end thereof, inserted into the optical communication connector 10B which is on the receptacle side. The movable member 12A and the movable member 12B respectively provided in the optical communication connector 10A and the optical communication connector 10B are configured such that the surfaces are brought into contact with each other when the optical communication connector 10A and the optical communication connector 10B are fitted to each other and optical junction is established.

The optical component 11A includes a collimating lens 111A. The optical component 11A retains an optical transmission path 202A inside the cable main body 201.

The optical component 11A is provided with an optical transmission path insertion hole (not shown) into which an end portion of the optical transmission path 202A is inserted. The end portion of the optical transmission path 202A is supported through the optical transmission path insertion hole inside the optical component 11A such that the optical axes of the optical transmission path 202A and the collimating lens 111A are aligned with each other.

The optical transmission path is an optical fiber for example. It should be noted that the optical transmission path is not particularly limited and may be other than the optical fiber as long as the optical transmission path is capable of transmitting light.

The optical component 11B includes a collimating lens 111B. The optical component 11B supports the end portion of the optical transmission path 202B inside the electronic apparatus 100. The optical transmission path 202B is an optical fiber for example. It should be noted that the optical transmission path 202B is not particularly limited and may be other than the optical fiber as long as the optical transmission path 202B is capable of transmitting light.

The optical component 11B is provided with an optical transmission path insertion hole (not shown) into which an end portion of the optical transmission path 202B is inserted. The end portion of the optical transmission path 202B is supported through the optical transmission path insertion hole inside the optical component 11B such that the optical axes of the optical transmission path 202B and the collimating lens 111B are aligned with each other.

The optical component 11A (11B) is configured to be capable of emitting collimated light adjusted to be parallel by the collimating lens 111A (111B) or allowing collimated light from the optical component 11B (11A) of the counterpart connector to enter the optical component 11A (11B).

The optical component 11A and the optical component 11B that are optically joined with each other are correspondingly arranged such that their collimating lens 111A and collimating lens 111B are positioned on the same optical axis during fitting.

Light emitted from the optical component 11A (11B) is incident upon the movable member 12A (12B). Moreover, light, which is emitted from the optical component 11B (11A) of the optical communication connector 10B (10A) that is the counterpart connector and passes through the movable member 12B (12A), is incident upon the movable member 12A (12B).

The incident light incident upon the movable member 12A (12B) thus includes light emitted from the optical component 11A (11B) and light emitted from the optical component 11B (11A) of the counterpart connector 10B (10A) and passing through the movable member 12B (12A).

The movable member 12A (12B) is configured to be movable between a first state taken during non-fitting to the optical communication connector 10B (10A) that is the counterpart connector and a second state taken during fitting to the optical communication connector 10B (10A).

The movable member 12A (12B) is supported by the movable member-rotating shaft 13A (13B) provided in the movable member 12A (12B) and is configured as a rotor rotatable about the movable member-rotating shaft 13A (13B). The movable member 12A (12B) is capable of rotating about the movable member-rotating shaft 13A (13B) and taking the first state and the second state.

The movable member 12A (12B) has a plate shape. The movable member 12A (12B) includes the reflective portion 121A (121B) that is a non-light-transmissive portion and the transmissive portion 122A (122B) in a flat surface orthogonal to a direction of the thickness.

The reflective portion 121A (121B) has a frame shape and the transmissive portion 122A (122B) is located within a region surrounded by the reflective portion 121A (121B) and is positioned at the center of the flat surface of the movable member 12A (12B).

The transmissive portion 122A (122B) is constituted by a translucent member such as a prism and a glass. The transmissive portion 122A (122B) includes an incident surface upon which light is incident and an emission surface from which light is emitted, the incident surface and the emission surface being arranged in parallel to be opposite to each other. Light perpendicularly incident upon the incident surface is refracted and is perpendicularly emitted from the emission surface.

The reflective portion 121A (121B) has a surface mirror-finished, for example, to be configured to reflect light on the surface.

The movable member 12A (12B) is configured such that when light is emitted from the optical component 11A (11B), incident light 40 from the optical component 11A (11B) is obliquely incident upon the flat surface of the movable member 12A (12B) in the first state during non-fitting. Furthermore, the reflective portion 121A (121B) of the movable member 12A (12B) is arranged such that the incident light 40 from the optical component 11A (11B) is incident upon the reflective portion 121A (121B) in the first state.

The movable member 12A (12B) is configured such that the flat surface of the movable member 12A (12B) is perpendicular to the incident light 40 from the optical component 11A (11B) in the second state during fitting. The transmissive portion 122 of the movable member 12A (12B) is arranged such that in the second state, light from the optical component 11A (11B) is incident upon the transmissive portion 122A (122B).

In the second state, the movable member 12A (12B) aligns the incident light 40 from the optical component 11A (11B), which is incident upon the transmissive portion 122A (122B) of the movable member 12A (12B), with an optical axis 40a of the incident light 40 and emits the aligned incident light 40.

The springs 14A (14B) are torsion springs and are provided in the spring-fixing portions 15A (15B) and the movable member-rotating shaft 13A (13B). The springs 14A (14B) are urging members that urge the movable member 12A (12B) in a direction to move from the second state to the first state.

The spring-fixing portions 15A (15B) are fixedly provided inside the optical communication connector 10A (10B). The springs 14A (14B) are fixed to the spring-fixing portions 15A (15B).

The stoppers 16A (16B) limit the rotation of the movable member 12A (12B) through the springs 14A (14B) and defines the position of the movable member 12A (12B) in the first state during non-fitting. The stoppers 16A (16B) each have a bar shape and are provided to be capable of being brought into contact with the movable member 12A (12B).

In a case where upper and lower directions are defined such that the stoppers 16A (16B) are located on the lower side as viewed from the movable member-rotating shaft 13A (13B), the movable member 12A (12B) of the optical communication connector 10A (10B) is, in the first state, urged by the springs 14A (14B) such that the upper portion is spaced apart from the optical component 11A (11B).

During non-fitting, the movable member 12A (12B) has rotational energy due to the force of the springs 14A (14B). However, the movable member 12A (12B) is brought into contact with the stoppers 16A (16B) such that the rotation is limited, and the movable member 12A (12B) is stabilized in the first state.

By inserting the optical communication connector 10A into the optical communication connector 10B, the movable member 12A and the movable member 12B are brought into contact with each other with the respective upper portions held in contact with each other. Since the movable member 12A and the movable member 12B are brought into physical contact with each other and, in addition, the optical communication connector 10B is inserted in this manner, the force of the springs 14A (14B) to rotate the movable member 12A (12B) is pushed back. Accordingly, as shown in FIG. 4, the movable members 12A and 12B move such that the respective flat surfaces are perpendicular to the incident light 40, and the movable member 12A and the movable member 12B are brought into contact with each other on the flat surfaces facing each other.

The state in which the movable member 12A and the movable member 12B are held in contact with each other on the surfaces facing each other is retained by a lock member (not shown) and the optical junction state is provided. The incident and emission surfaces of the movable member 12A and the movable member 12B are perpendicular to the incident light 40, collimated light is orthogonal between both the optical communication connectors, and optical communication becomes possible.

During fitting, the region of the transmissive portion 122A of the movable member 12A and the region of the transmissive portion 122B of the movable member 12B overlap each other. The incident light 40 from the optical component 11A (11B) passes through the transmissive portion 122A (122B) and the transmissive portion 122B (122A) and is incident upon the collimating lens 111B (111A) of the counterpart connector.

Figure 5A:
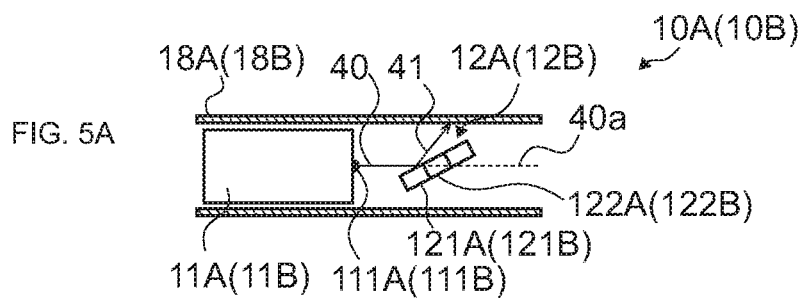
FIGS. 5A and 5B A cross-sectional view showing an optical path of light incident upon a movable member from the optical component during fitting and during non-fitting of the optical communication connector set in FIG. 1.
Figure 5B:
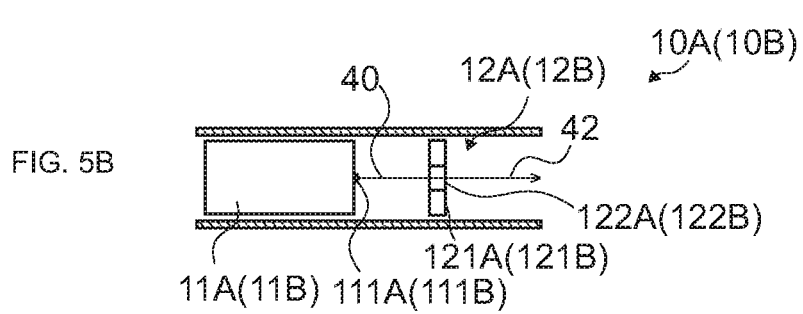

FIG. 5A is an enlarged cross-sectional view showing an optical path of light incident upon the movable member 12A (12B) from the optical component 11A (11B) during non-fitting. FIG. 5B is an enlarged cross-sectional view showing an optical path of light incident upon the movable member 12A (12B) from the optical component 11A (11B) during fitting.

FIG. 6A is an enlarged cross-sectional view of the optical communication connector 10A and the optical communication connector 10B during fitting. FIGS. 6A and 6B show a state in which light emitted from the optical component 11B passes through the movable member 12B and the movable member 12A and is emitted therefrom in the state order and is incident upon the optical component 11 A.

Here, light, which is emitted from the optical component 11A (11B) and is directly incident upon the movable member 12A (12B) when the movable member 12A (12B) is held in the second state, will be referred to as the incident light 40. This incident light 40 upon the movable member 12A (12B) passes through the movable member 12A (12B) and is emitted from the movable member 12A (12B), and this light will be referred to as light 42.

The light 42 is emission light at the movable member 12A (12B) and is incident light at the movable member 12B (12A). The light 42 is incident upon the movable member 12B (12A), passes through the movable member 12B (12A), and is emitted from the movable member 12B (12A). This light passing through the movable member 12A (12B) and the movable member 12B (12A) in the stated order and emitted therefrom will be referred to as emission light 43.

Moreover, the incident light 40 incident when the movable member is held in the first state is reflected, refracted, or scattered on the movable member, and this light will be referred to as light 41. In this embodiment, the incident light 40 incident when the movable member 12A (12B) is held in the first state is reflected on the movable member 12A (the movable member 12B), and thus the light 41 is reflected light.

Moreover, in the figure, the optical axis of the incident light 40 is denoted by the reference sign 40a.

Hereinafter, also in other embodiments, similar configurations will be denoted by reference signs, for example, the incident light 40, the light 41, the light 42, the emission light 43, and the optical axis 40a, and the descriptions will be given.

Moreover, in the movable member 12A (12B), a surface upon which the incident light 40 or the light 42 is incident is the incident surface and a surface from which the light 42 or the emission light 43 is emitted is the emission surface. The optical communication connector is capable of transmitting and receiving light to/from the counterpart connector, and thus a surface of the plate-shaped movable member 12A (12B) in the second state, which faces the optical component 11A (11B), can be both the incident surface and the emission surface. Similarly, a surface opposite to the surface of the plate-shaped movable member 12A (12B) in the second state, which faces the optical component 11A (11B), can also be both the incident surface and the emission surface.

As shown in FIG. 5A, during non-fitting to the counterpart connector, the movable member 12A (12B) takes the first state in which its flat surface is positioned to be oblique to the incident light 40 from the optical component 11A (11B) when the light is emitted from the optical component 11A (11B).

In the movable member 12A (12B) in the first state during non-fitting, the incident light 40 from the optical component 11A (11B) is incident upon the reflective portion 121A (121B).

The light 41 reflected on the reflective portion 121A (121B) travels on an optical path toward an inner wall of the first outer wall portion 18A (18B), i.e., the inside of the optical communication connector 10A (10B). Therefore, the incident light 40 from the optical component 11A (11B) is prevented from being directly emitted to the outside of the optical communication connector 10A (10B).

On the other hand, as shown in FIG. 5B and FIG. 6A, during fitting of the optical communication connector 10A to the optical communication connector 10B, the movable member 12A and the movable member 12B are held in the second state in which its flat surface is positioned to be perpendicular to the incident light 40 from the optical component 11A or the optical component 11B.

In the movable member 12A (the movable member 12B) in the second state during fitting, the incident light 40 upon the optical component 11A (11B) from the optical transmission path 202A (202B) is incident upon the transmissive portion 122A (the transmissive portion 122B).

As shown in FIG. 5B and FIG. 6A, during fitting, the incident light 40 from the optical component 11B passes through the transmissive portion 122B of the movable member 12B and the emitted light 42 is directly emitted to the outside of the optical communication connector 10B and is incident upon the counterpart connector 10A. The light 42 incident upon the counterpart connector 10A passes through the transmissive portion 122A of the movable member 12A and the emission light 43 emitted from the movable member 12A is incident upon the collimating lens 111A.

It should be noted that although the incident light 40 from the optical component 11B has been described in FIG. 6A, the same applies to the incident light 40 from the optical component 11A. That is, during fitting, the incident light 40 from the optical component 11A passes through the transmissive portion 122A of the movable member 12A and the transmissive portion 122B of the movable member 12B in the stated order and is incident upon the collimating lens 111B.

During non-fitting, the light incident upon the movable member 12A (12B) is reflected on the movable member 12A (12B). The reflected light 41 is not directly emitted to the outside of the optical communication connector 10A (10B) unlike the case of fitting and travels toward the inner wall of the first outer wall portion 18A (18B).

Since the portion of the first outer wall portion 18A (18B), which is irradiated with the light 41, is constituted by the scattering member, the light 41 incident upon the first outer wall portion 18A (18B) is scattered on the first outer wall portion 18A (18B). Therefore, even if light, which is not coupled between the optical communication connectors 10A and 10B and leaks, is emitted to the outside, the light is emitted to the outside with the power of the light attenuated.

Accordingly, light emitted to the outside of the optical communication connector 10A (10B) during non-fitting can be adjusted down to the level according to safety standards and the safety for optical junction work of the optical communication connector is enhanced.

Moreover, in this embodiment, the collimating lenses 111A and 111B are not exposed to the outside environment by providing the movable members 12A and 12B. Therefore, entry of dust and the like is suppressed and, in addition, sticking of oil and the like is suppressed, and thus the optical communication connector set according to this embodiment is especially suitable for a consumer device, which is relatively frequently inserted and removed, because of its resistance to impurities.

FIG. 6A is a diagram showing a state in which foreign matter 30 such as dust does not exist between the movable member 12A and the movable member 12B during fitting and FIG. 6B is a diagram showing a state in which the foreign matter 30 exists between the movable member 12A and the movable member 12B during fitting. Here, a contact surface between the movable member 12A and the movable member 12B in the fitting state in which the foreign matter 30 and the like do not exist will be referred to as a virtual boundary plane. Moreover, FIGS. 6A and 6B show a state in which light emitted from the optical component 11B passes through the movable member 12B and the movable member 12A and is emitted therefrom in the state order and is incident upon the optical component 11A.

As shown in FIG. 6A, the movable member 12A and the movable member 12B have the same shape, and thus the movable member 12A and the movable member 12B have a structure to be plane-symmetric to each other with respect to the virtual boundary plane in the fitting state in which the foreign matter 30 does not exist.

As shown in FIG. 6B, in a case where the foreign matter 30 having a shape nearly plane-symmetric with respect to the virtual boundary plane exists between the movable member 12A and the movable member 12B, the movable member 12A and the movable member 12B have a structure plane-symmetric with respect to the virtual boundary plane.

Therefore, also in the state in which the foreign matter 30 exists, the incident light 40 from the optical component 11B, which is incident upon the transmissive portion 122B of the movable member 12B, is refracted on the incident surface and the emission surface of the movable member 12B and the incident surface and the emission surface of the movable member 12A while emission light 43', which passes through the movable members 12B and 12A and is emitted therefrom in the stated order, follows the same optical path as the emission light 43 passing therethrough in the state in which the foreign matter 30 does not exist. It should be noted that the same applies also in a case where the optical communication connector 10B is a receiver.

As described above, with the configuration of this embodiment, a stable and highly reliable optical communication characteristic tolerant to entry of the foreign matter and the like is provided as compared to physical optical junction in which the optical transmission paths of the optical communication connectors on the receptacle and plug sides are brought into direct contact with each other.

[Configuration of Electronic Apparatus]

Next, the electronic apparatus 100 will be described. As shown in FIG. 1, the electronic apparatus 100 includes the optical transmission/reception unit 110. The optical transmission/reception unit 110 includes a light-emitting section 120 for an optical signal, a light-receiving section 130 for an optical signal, and the optical communication connector 10B as the receptacle.

The light-emitting section 120 outputs data that the electronic apparatus 100 has to send as an optical signal and inputs it in the optical communication connector 10B via an optical transmission path 202B arranged on the side of an end of the light-emitting section 120.

Moreover, the light-receiving section 130 receives an optical signal from the optical communication connector 10B via the optical transmission path 202B and outputs it to an interface inside the electronic apparatus 100.

Figure 7:
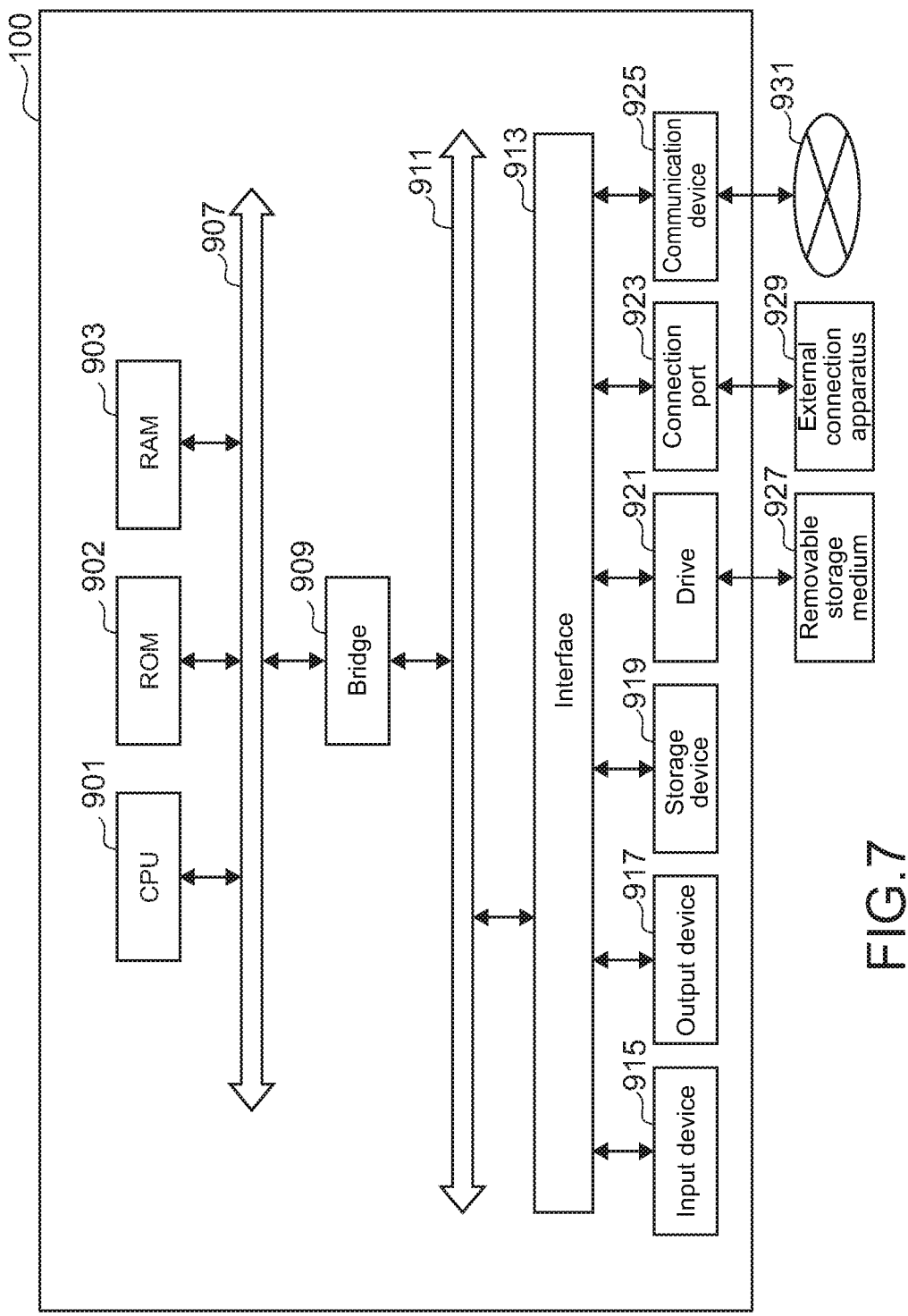
FIG. 7 A block diagram for describing a hardware configuration of an electronic apparatus according to the first embodiment.

Moreover, a detailed hardware configuration of the electronic apparatus 100 is not particularly limited. For example, FIG. 7 shows an example of the detailed hardware configuration of the electronic apparatus 100. FIG. 7 is a block diagram for describing a hardware configuration of the electronic apparatus 100 according to the first embodiment.

The electronic apparatus 100 mainly includes a CPU 901, a ROM 902, and a RAM 903. The electronic apparatus 100 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the overall operation or a part of the operation of the electronic apparatus 100 in accordance with various programs recorded on the ROM 902, the RAM 903, the storage device 919, or a removable recording medium 84. The ROM 902 temporarily stores programs that the CPU 901 uses, parameters varying as appropriate during the execution of the programs, and the like. They are connected to each other via the host bus 907 constituted by an internal bus such as a CPU bus.

The host bus 907 is connected to the external bus 911 such as a peripheral component interconnect/interface (PCI) bus via the bridge 909.

The input device 915 is an operational tool operated by a user such as a mouse, a keyboard, a touchscreen, a button, a switch, or a lever, for example. In addition, for example, the input device 915 may be a remote control tool (so-called remote controller) using infrared ray or other electric waves, or may be an external connection apparatus 929 such as a mobile phone or a PDA that are compatible with operation of the electronic apparatus 100. Furthermore, the input device 915 may include an input control circuit or the like that is configured to generate an input signal on the basis of information input by the user using the aforementioned operational tool and to output the generated input signal to the CPU 901. The user of the electronic apparatus 100 is capable of inputting various types of data to the electronic apparatus 100, and instructing the electronic apparatus 100 to perform processing operation, by operating the input device 915.

The output device 917 includes a device that can visually or audibly report acquired information to the user. Examples of such a device include display devices such as a CRT display device, a liquid crystal display device, a plasma display device, an EL display device, and lamps, audio output devices such as a speaker and a headphone, a printer, a mobile phone, a fax machine, and the like. The output device 917 outputs, for example, results acquired through various processes performed by the electronic apparatus 100. Specifically, the display device displays results acquired through various processes performed by the electronic apparatus 100 in a text format, or in an image format. On the other hand, the audio output device converts an audio signal including reproduced audio data, acoustic data, or the like into an analog signal, and outputs the analog signal.

The storage device 919 is a device for data storage. The storage device 919 is an example of a storage of the electronic apparatus 100. The storage device 919 includes, for example, a magnetic storage device such as a hard disk drive (HDD), a semiconductor storage device, an optical storage device, a magneto-optical storage device, or the like. The storage device 919 stores therein programs and various kinds of data executed by the CPU 901, various kinds of data acquired from an outside, and the like.

The drive 921 is a reader/writer for a recording medium, and is incorporated in or externally attached to the electronic apparatus 100. The drive 921 reads information recorded on the removable recording medium 84 that is mounted such as a magnetic disk, an optical disc, a magneto-optical disk, or semiconductor memory, and outputs the information to the RAM 903. In addition, the drive 921 is also capable of writing records into the removable recording medium 84 that is mounted such as a magnetic disk, an optical disc, a magneto-optical disk, or semiconductor memory. Examples of the removable recording medium 84 include a DVD medium, an HD-DVD medium, a Blu-ray medium, and the like. Alternatively, the removable recording medium 84 may be CompactFlash (CF) (registered trademark), flash memory, a secure digital (SD) memory card, or the like. Alternatively, the removable recording medium 84 may be, for example, an electronic apparatus, an integrated circuit (IC) card on which a non-contact IC chip is mounted, or the like.

The connection port 923 is a port used for directly connecting an apparatus to the electronic apparatus 100. Examples of the connection port 923 include a Universal Serial Bus (USB) port, an IEEE 1394 port, a Small Computer System Interface (SCSI) port, and the like. Other examples of the connection port 923 include an RS-232C port, an optical digital terminal, a High-Definition Multimedia Interface (HDMI) port, and the like. By connecting the external connection apparatus 929 to the connection port 923, the electronic apparatus 100 is capable of directly acquiring various kinds of data from the external connection apparatus 929 and providing various kinds of data to the external connection apparatus 929. It should be noted that, the optical digital terminal may be implemented as the optical transmission/reception unit 110 including the optical communication connector 10B described above.

The communication device 925 is a communication interface including, for example, a communication device or the like for connection to a communication network 931. According to the present embodiment, the communication device 925 includes the optical transmission/reception unit 110 including the optical communication connector 10B described above. The communication device 925 may be a router for optical communication. In addition, the communication device 925 may further include, for example, a communication card or the like for a wired or wireless local area network (LAN), Bluetooth (registered trademark) or a wireless USB (WUSB). In addition, the communication device 925 may also include a router for asymmetric digital subscriber line (ADSL), a modem for various types of communication, or the like. For example, the communication device 925 is capable of transmitting and receiving signals and the like to and from the Internet or other communication apparatuses, for example, in accordance with a predetermined protocol of TCP/IP, FTTx such as FTTR, FTTB, FTTH, or FTTD, or the like. In addition, the communication network 931 to which the communication device 925 connects is constituted by a network established through wired or wireless connection. The communication network 931 may be, for example, the Internet, a home LAN, infrared communication, radio communication, satellite communication, or the like.

[Configuration of Optical Communication Cable]

The optical communication cable 200 includes the cable main body 201 and the optical communication connector 10A. The cable main body 201 includes the optical transmission path 202A therein. The optical transmission path 202A is an optical fiber for example. It should be noted that the optical transmission path 202A is not particularly limited and may be other than the optical fiber as long as the optical transmission path 202A is capable of transmitting light. The optical transmission path 202A is, at an outer circumferential surface thereof, coated as appropriate. Moreover, the optical communication connector 10A is connected on the side of an end of the optical transmission path 202A.

Such an optical communication cable 200 can be used for connection for optical communication between an electronic apparatus such as the electronic apparatus 100 as described above and another apparatus.

As described above, in this embodiment, an optical path which is communicable only in a state in which the optical communication connector 10A and the counterpart optical communication connector 10B are fitted to each other and optically joined with each other is ensured by providing the connectors with the movable members.

On the other hand, since the collimated light radiated to the inner wall of the first outer wall portion which is the scattering portion is scattered due to the change in optical path of the incident light from the optical component during non-fitting, the power of the collimated light can be reduced down to a safe level even if a user directly views inside the connector, and the safety can be ensured.

Hereinafter, other embodiments will be described. It should be noted that configurations similar to those of the first embodiment will be denoted by similar reference signs and descriptions thereof will be omitted in some cases.

Second Embodiment

Next, an optical communication connector according to a second embodiment will be described with reference to FIGS. 9A, 9B, and 10. This embodiment is different from the first embodiment mainly in that the structure of the movable member is different, the rotating mechanism of the movable member is different, only one optical communication connector in the optical communication connector set is provided with the movable member, and a cover member is provided.

An optical communication connector set 210 including an optical communication connector 210A and an optical communication connector 210B, which will be described in this embodiment, can be used for optical junction of the electronic apparatus 100 with the optical communication cable 200 as in the optical communication connector set 10 according to the first embodiment.

Figure 8:
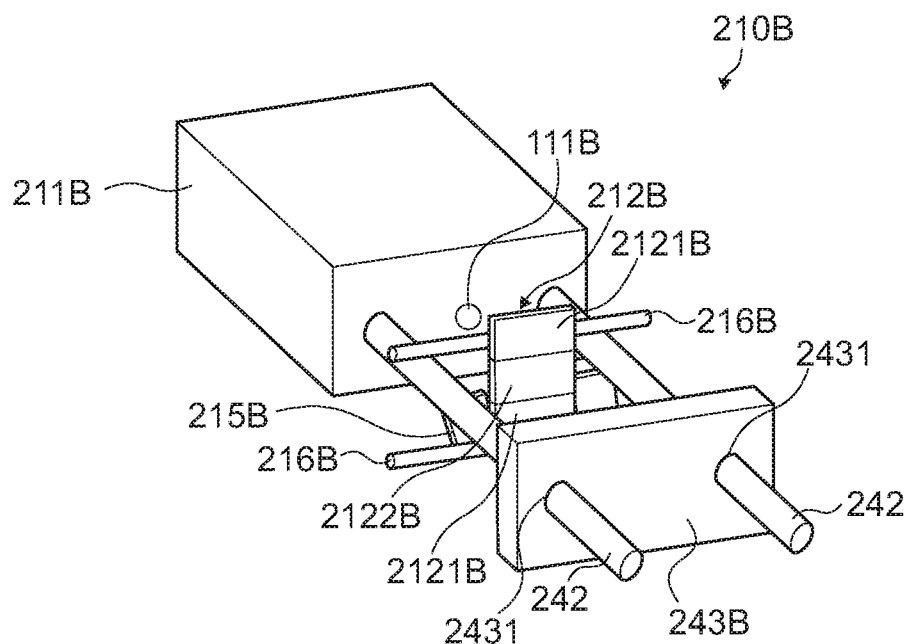
FIG. 8 A schematic perspective view of an optical communication connector on the receptacle side according to a second embodiment.

FIG. 8 is a schematic perspective view of an optical communication connector on the receptacle side according to this embodiment and shows a state in which positioning pins provided in the optical communication connector on the plug side are inserted.

Figure 9A:
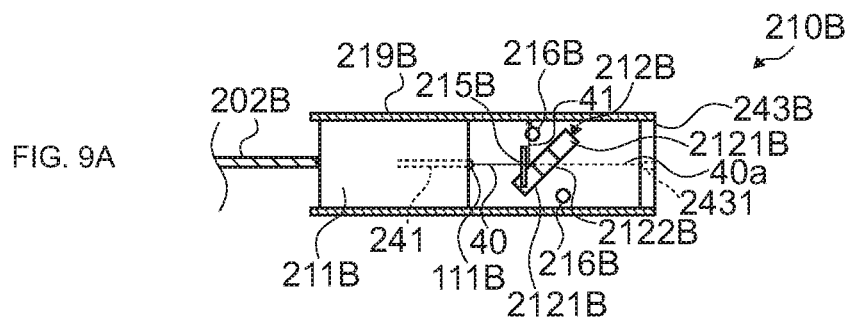
FIGS. 9A and 9B A cross-sectional view of each of optical communication connectors on the receptacle and plug sides during non-fitting, the optical communication connectors constituting the optical communication connector set according to the second embodiment.

FIG. 9A is a schematic cross-sectional view of the optical communication connector on the receptacle side during non-fitting.

Figure 9B:
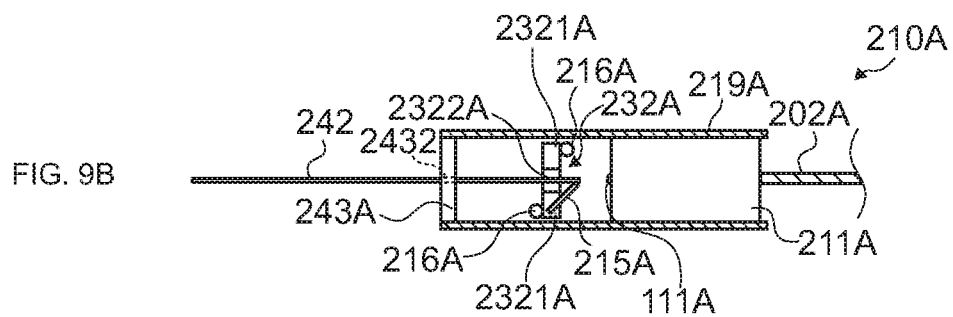

FIG. 9B is a schematic cross-sectional view of the optical communication connector on the plug side during non-fitting.

Figure 10:
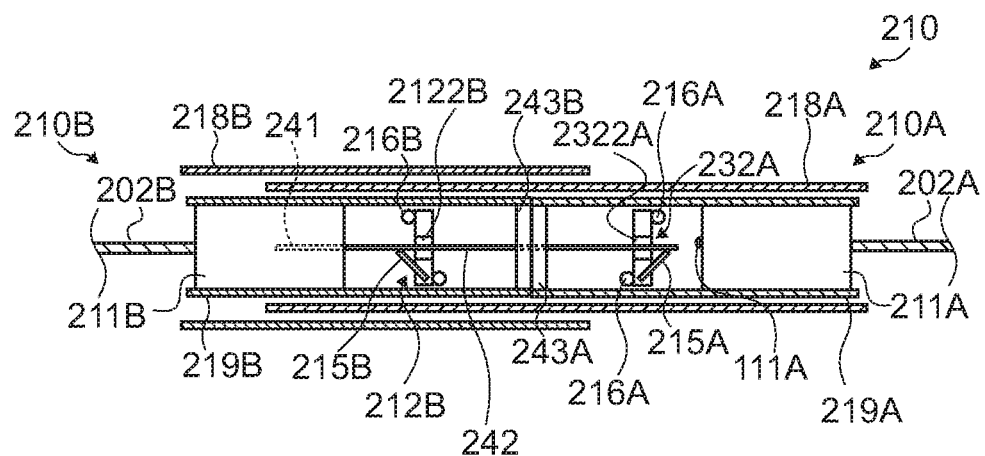
FIG. 10 A cross-sectional view of the optical communication connector set in FIGS. 9A and 9B during fitting.

FIG. 10 is a schematic cross-sectional view of the optical communication connector set during fitting.

In FIGS. 8, 9A, and 9B, the illustration of first outer wall portions 218A and 218B is omitted.

The optical communication connector 210B provided on the receptacle side includes a first outer wall portion 218B, a second outer wall portion 219B, an optical component 211B, a movable member 212B, a movable member-rotating shaft (not shown), springs (not shown), spring-fixing portions (not shown), a rotation-assisting plate 215B, two stoppers 216B, and a cover member 243B.

It should be noted that the optical communication connector 210B can include a positioning member for positioning each member, a protection member for protecting each member, a casing for supporting each member, and the like as appropriate besides the above-mentioned configuration.

The first outer wall portion 218B has a tubular body having a rectangular cross-section. The first outer wall portion 218B is provided to retain the second outer wall portion 219B and cover the second outer wall portion 219B. The first outer wall portion 218B includes, at one end thereof, an opening into which the first outer wall portion 218A of the optical communication connector 210A that is on the plug side is inserted.

The second outer wall portion 219B has a tubular body having a rectangular cross-section. The second outer wall portion 219B is formed to cover the optical component 211B, the movable member 212B, the movable member-rotating shaft, the springs, the spring-fixing portions, and the two stoppers 216B. A portion of an inner wall of the second outer wall portion 219B, which is irradiated with light reflected on reflective portions 2121B during non-fitting, are constituted by scattering members and the second outer wall portion 219B functions as a scattering portion.

The cover member 243B is positioned to close the opening of the second outer wall portion 219B, which is on the side of the optical communication connector 210A, when fitting the optical communication connector 210A and the optical communication connector 210B to each other.

The cover member 243B prevents foreign matter such as dust from entering from the outside. The cover member 243B is constituted by a light-transmissive member. Two through-holes 2431 into which positioning pins 242 can be inserted are formed in the cover member 243B.

The optical component 211B includes a collimating lens 111B. The optical component 211B retains the side of an end of an optical transmission path 202B inside the electronic apparatus 100. The optical component 211B is configured to be capable of emitting collimated light adjusted to be parallel by the collimating lens 111B or allowing collimated light from an optical component 211A of the counterpart connector to enter the optical component 211B.

The optical component 211B are provided with an optical transmission path insertion hole (not shown) into which an end portion of an optical transmission path 202B is inserted and two positioning holes 241 spatially separated from the optical transmission path insertion hole. The end portion of the optical transmission path 202B is supported inside the optical component 211B through the optical transmission path insertion hole such that the optical axes of the optical transmission path 202B and the collimating lens 111B are aligned with each other.

The positioning pins 242 provided in the optical communication connector 210A that is the counterpart connector are inserted into the positioning holes 241 during fitting. The positioning holes 241 are arranged on both sides of the collimating lens 111B with the collimating lens 111B interposed therebetween one by one.

Incident light 40 emitted from the optical component 211B is incident upon the movable member 212B. Moreover, light 42, which is emitted from the optical component 211A of the optical communication connector 210A that is the counterpart connector and passes through a plate portion 232A to be described later, is incident upon the movable member 212B. The movable member 212B is configured to be movable between a first state taken during non-fitting and a second state taken during fitting.

The movable member-rotating shaft, the springs, and the spring-fixing portions (not shown) have configurations similar to those of the first embodiment and the movable member is configured to be rotatable about the movable member-rotating shaft as in the first embodiment. The spring-fixing portions are fixed to the second outer wall portion 219B inside the second outer wall portion 219B.

The movable member 212B is supported by the movable member-rotating shaft provided in the movable member 212B and is configured as a rotor rotatable about the movable member-rotating shaft. The movable member 212B is capable of rotating about the movable member-rotating shaft and taking the first state and the second state.

The movable member 212B has a plate shape. The movable member 212B includes the reflective portions 2121B and a transmissive portion 2122B in a flat surface orthogonal to a direction of the thickness. In the figure, the transmissive portion 2122B is located at the center and the reflective portions 2121B are respectively located in the upper and lower portions to be opposite to each other with this transmissive portion 2122B interposed therebetween.

The transmissive portion 2122B is constituted by a light-transmissive member such as a prism and a glass. The transmissive portion 2122B includes an incident surface upon which light is incident and an emission surface from which light is emitted, the incident surface and the emission surface being arranged in parallel to be opposite to each other. Light perpendicularly incident upon the incident surface is refracted and is perpendicularly emitted from the emission surface.

The reflective portions 2121B each have a surface mirror-finished, for example, to be configured to reflect light on the surface.

The movable member 212B is positioned such that light from the optical component 211B is obliquely incident upon the flat surface of the movable member 212B in the first state during non-fitting. Moreover, the reflective portions 2121B of the movable member 212B are arranged such that light from the optical component 211B is incident upon the reflective portions 2121B in the first state.

The movable member 212B is positioned such that the flat surface of the movable member 212B is perpendicular to the incident light 40 from the optical component 211B in the second state during fitting. The transmissive portion 2122B of the movable member 212B is arranged such that light from the optical component 211B or 211A is incident upon the transmissive portion 2122B and passes through the transmissive portion 2122B in the second state.

The rotation-assisting plate 215B is fixed to a lower portion of the movable member 212B. The rotation-assisting plate 215B has a plate shape and is fixed such that its flat surface is positioned to be oblique to the flat surface of the movable member 212B.

When the optical communication connector 210A is inserted into the optical communication connector 210B, the positioning pins 242 provided in the optical communication connector 210A are brought into contact with the rotation-assisting plate 215B. Furthermore, the optical communication connector 210B is inserted, such that the positioning pins 242 push and move the rotation-assisting plate 215B. Interlocked with the movement of the rotation-assisting plate 215B, the movable member 212B rotates about the movable member-rotating shaft and moves from the first state to the second state.

The two stoppers 216B each have a bar shape, are located respectively corresponding to upper and lower portions of the movable member 212B, and are arranged to be opposite to each other with the movable member 212B interposed therebetween. The stoppers 216B are fixed to the second outer wall portion 219B.

The two stoppers 216B are provided to be capable of being brought into contact with the movable member 212B. The two stoppers 216B limit the rotation of the movable member 212B interlocked with the movement of the rotation-assisting plate 215B by the positioning pins 242 when the positioning pins 242 are inserted into the positioning holes 241. During fitting, the second state of the movable member 212B is maintained by the stoppers 216B.

The springs are urging members that urge the movable member 212B in the direction to move from the second state to the first state. The movable member 212B is urged by springs to be held in an oblique state such that the upper portion is spaced apart from the optical component 211B in the first state while the lower portion gets closer to the optical component 211B.

The optical communication connector 210A provided on the plug side includes a first outer wall portion 218A, a second outer wall portion 219A, the optical component 211A, the plate portion 232A, an assisting plate 215A, two stoppers 216A, positioning pins 242, and a cover member 243A. It should be noted that the optical communication connector 210A can include a positioning member for positioning each member, a protection member for protecting each member, a casing for supporting each member, and the like as appropriate besides the above-mentioned configuration.

The first outer wall portion 218A has a tubular body having a rectangular cross-section. The first outer wall portion 218A is provided to retain the second outer wall portion 219A and covers the second outer wall portion 219A. One end of the first outer wall portion 218A is inserted into the first outer wall portion 218B of the optical communication connector 210B that is on the receptacle side.

The second outer wall portion 219A has a tubular body having a rectangular cross-section. The second outer wall portion 219A is formed to cover the optical component 211A, the plate portion 232A, the assisting plate 215A, the two stoppers 216A, and the positioning pins 242.

The cover member 243A is positioned to close the opening of the second outer wall portion 219A, which is on the side of the optical communication connector 210B, when fitting the optical communication connector 210A and the optical communication connector 210B to each other.

The cover member 243A prevents foreign matter such as dust from entering from the outside. The cover member 243A is constituted by a light-transmissive member. Through-holes 2432 into which the positioning pins 242 are inserted are formed in the cover member 243A. A state in which the positioning pins 242 have been inserted into those through-holes 2432 is shown.

The optical component 211A includes a collimating lens 111A. The optical component 211A retains the end portion of the optical transmission path 202A inside the cable main body 201. The optical component 211A emits collimated light adjusted to be parallel by the collimating lens 111B.

Light emitted from the optical component 211A is incident upon the plate portion 232A. The plate portion 232A has a plate shape. The plate portion 232A includes reflective portions 2321A and a transmissive portion 2322A in a flat surface orthogonal to a direction of the thickness. In the figure, the transmissive portion 2322A is located at the center and the reflective portions 2321A are respectively positioned at the upper portion and the lower portion to be opposite to each other with this transmissive portion 2322A interposed therebetween.

The transmissive portion 2322A is constituted by a light-transmissive member such as a prism and a glass. The transmissive portion 2322A includes an incident surface upon which light is incident and an emission surface from which light is emitted, the incident surface and the emission surface being arranged in parallel to be opposite to each other. Light perpendicularly incident upon the incident surface is refracted and is emitted from the emission surface. The reflective portions 2321A each have a surface mirror-finished, for example, to be configured to reflect light on the surface.

The plate portion 232A is configured such that the flat surface of the plate portion 232A is perpendicular to the incident light 40 from the optical component 211A. The transmissive portion 2322A of the plate portion 232A is arranged such that light from the optical component 211A passes through the transmissive portion 2322A.

During fitting, the transmissive portion 2322A of the plate portion 232A and the transmissive portion 2122B of the movable member 212B are positioned on an optical axis of light from the optical components 211A and 211B.

The assisting plate 215A is fixedly bonded to a lower portion of the plate portion 232A. The positioning pins 242 are fixedly bonded to the assisting plate 215A. The positioning pins 242 penetrate the through-holes 2432 provided in the cover member 243A and protrude to the outside from a surface of the cover member 243A, which is on the side of the optical communication connector 210B.

The two stoppers 216A each have a bar shape, are located respectively corresponding to upper and lower portions of the plate portion 232A, and are arranged to be opposite to each other with the plate portion 232A interposed therebetween. The two stoppers 216A are fixed to the second outer wall portion 219A.

The two stoppers 216A are bonded and fixed to the plate portion 232A. Accordingly, the plate portion 232A is maintained in a state in which its flat surface is perpendicular to the optical axis of the light from the optical component 211A.

As shown in FIGS. 9A and 9B, the movable member 212B takes a first state in which its flat surface is positioned to be oblique to light from the optical component 211B during non-fitting. In the first state, the incident light 40 from the optical component 211B is incident upon the reflective portions 2121B of the movable member 212B.

The light 41 reflected on the reflective portions 2121B travels on an optical path toward an inner wall of the second outer wall portion 219B, i.e., the inside of the optical communication connector 210B. Therefore, the incident light 40 from the optical component 211B is prevented from being directly emitted to the outside of the optical communication connector 210B.

As shown in FIG. 10, when the optical communication connector on the plug side 210A is inserted into the optical communication connector 210B on the receptacle side, the positioning pins 242 are inserted into the through-holes 2431 of the cover member 243B of the optical communication connector 210B.

In addition, when the positioning pins 242 are inserted such that the distance between the optical component 211A and the optical component 211B is shortened, and the rotation-assisting plate 215B is pushed and moved by the positioning pins 242. Interlocked with this movement of the rotation-assisting plate 215B, the movable member 212B rotates about the movable member-rotating shaft.

With the rotation, the movable member 212B moves from the first state in which its flat surface is oblique to the optical axis 40a of the incident light 40 to the second state in which its flat surface is perpendicular to the optical axis 40a of the incident light 40. By the movable member 212B taking the second state, the plate portion 232A of the optical communication connector 210A and the movable member 212B of the optical communication connector 210B become parallel to each other.

The state in which the plate portion 232A and the movable member 212B are parallel to each other is retained by a lock member (not shown) and the optical junction state is provided.

Accordingly, during fitting, light from the optical component 211B (211A) passes through the movable member 212B (plate portion 232A) and the plate portion 232A (movable member 212B) in the stated order and is incident upon the optical component 211A (211B) of the counterpart connector without being attenuated.

As described above, a configuration to rotate the movable member by the pins pushing a rotation-assisting plate fixed to the movable member.

In this embodiment, the optical communication connector 210B on the receptacle side takes the first state in which the movable member 212B is inclined during non-fitting. Accordingly, the incident light 40 emitted from the optical component 211B is reflected on the reflective portions 2121B of the movable member 212B.

The reflected light 41 travels on an optical path toward the inside of the optical communication connector 210B, is incident upon and scattered on the region of the inner wall of the second outer wall portion 219B, which is constituted by scattering member, and is not directly emitted to the outside of the optical communication connector 210B.

Therefore, even if light which is not optically coupled between the optical communication connectors 10A and 10B and leaks is emitted to the outside, the light is emitted to the outside with the power of the light attenuated, and the safety for the work is enhanced.

Moreover, in this embodiment, it is unnecessary to bring the movable member into physical contact with the plate portion, and thus the cover member can be provided and entry of dust and the like in the optical communication connector can be suppressed.

Moreover, in this embodiment, the positioning pins and the positioning holes are provided, and thus the positioning accuracy of optical junction of the optical component 211A of the optical communication connector 210A with the optical component 211B of the optical communication connector 210B is enhanced.

In this embodiment, the configuration to rotate the movable member 212B through the positioning pins used for positioning. However, a pin to rotate the movable member 212B may be provided besides the positioning pins. It should be noted that as in this embodiment, with the configuration to rotate the movable member 212B through the positioning pins, the number of components can be reduced and the optical component design range related to the number of collimating lenses and the like can be widened.

It should be noted that in this embodiment, the pin insertion holes are provided in the optical communication connector on the receptacle side and the pins are provided in the optical communication connector on the plug side, though those may be inverted.

Third Embodiment

Next, an optical communication connector according to a third embodiment will be described with reference to FIGS. 11, 12A, 12B, and 13. Hereinafter, configurations similar to those of the above-mentioned embodiments will be denoted by similar reference signs and descriptions thereof will be omitted in some cases.

An optical communication connector set 310 including an optical communication connector 310A and an optical communication connector 310B, which will be described in this embodiment, can be used for optical junction of the electronic apparatus 100 with the optical communication cable 200 as in the optical communication connector sets 10 and 210 according to the above-mentioned embodiment.

This embodiment is the same as the second embodiment in that the configuration to rotate the movable member through the pins is employed.

In the second embodiment, the aspect in which the plate portion provided in the optical communication connector on the plug side is fixed and cannot rotate has been shown. In contrast, in this embodiment, the movable member including a transmissive portion that allows light to pass therethrough and reflective portions that reflects light is configured to be rotatable, the movable member being provided in the optical communication connector on the plug side.

Figure 11:
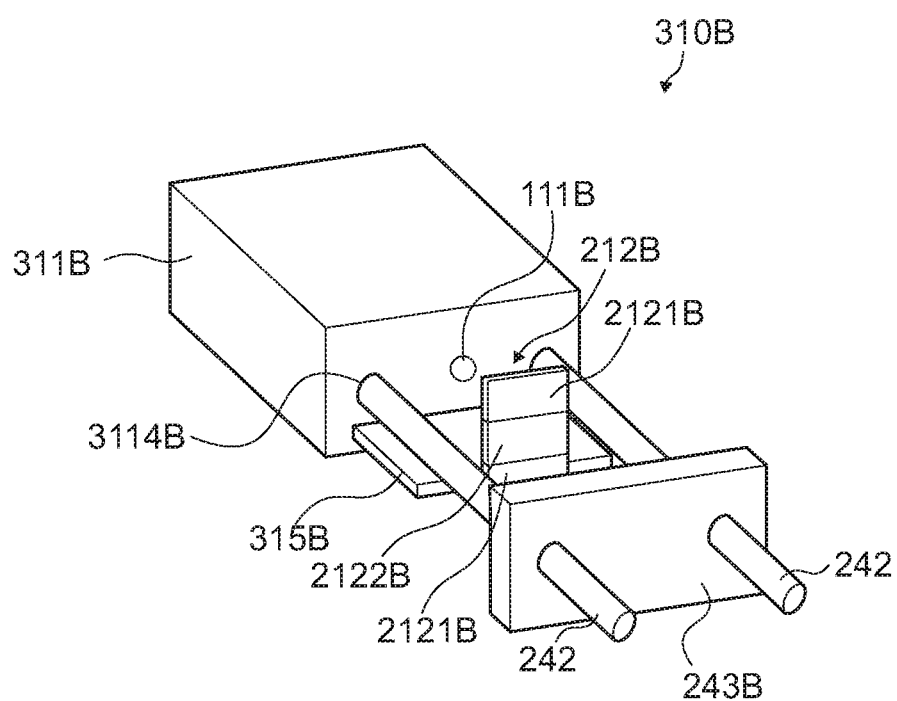
FIG. 11 A schematic perspective view of an optical communication connector on the receptacle side according to a third embodiment.

FIG. 11 is a schematic perspective view of an optical communication connector on the receptacle side according to this embodiment and shows a state in which positioning pins provided in the optical communication connector on the plug side are inserted.

Figure 12A:
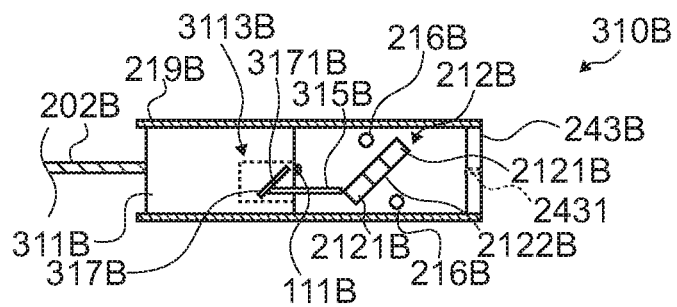
FIGS. 12A and 12B A cross-sectional view each of optical communication connectors on the receptacle and plug sides during non-fitting, the optical communication connectors constituting the optical communication connector set according to the third embodiment.
Figure 12B:
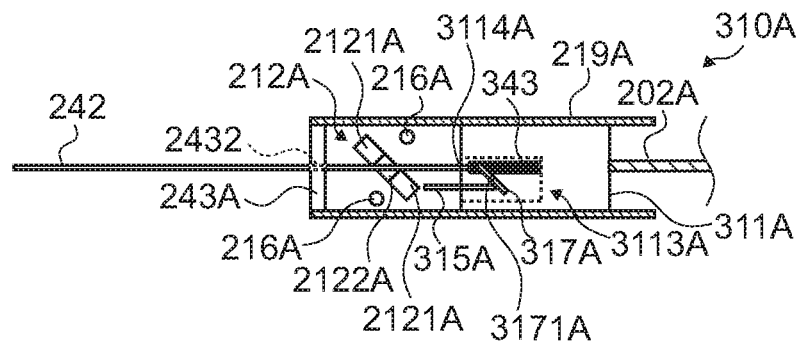

FIG. 12A is a schematic cross-sectional view of the optical communication connector on the receptacle side during non-fitting. FIG. 12B is a schematic cross-sectional view of the optical communication connector on the plug side during non-fitting.

Figure 13:
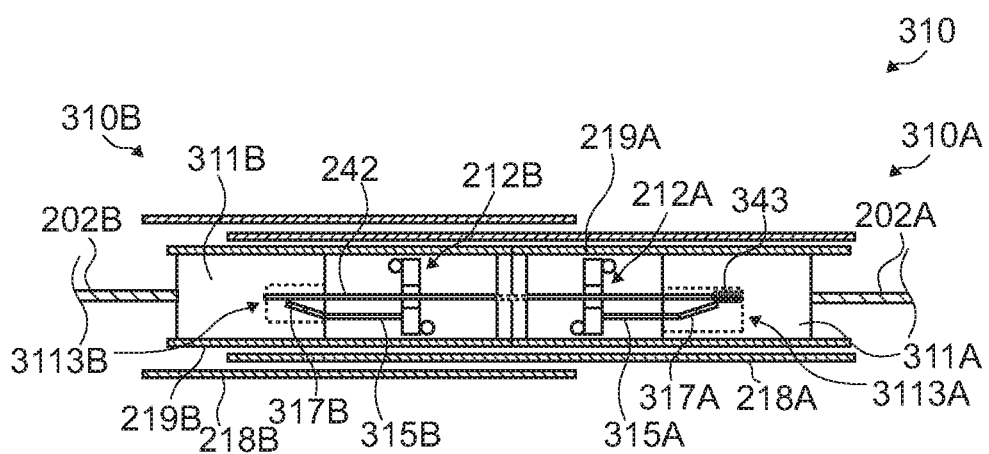
FIG. 13 A cross-sectional view of the optical communication connector set in FIGS. 12A and 12B during fitting.

FIG. 13 is a schematic cross-sectional view of the optical communication connector set during fitting.

In FIGS. 11, 12A and 12B, the illustration of the first outer wall portions 318A and 318B is omitted.

The optical communication connector 310B provided on the receptacle side includes a first outer wall portion 218B, a second outer wall portion 219B, an optical component 311B, a movable member 212B, a movable member-rotating shaft (not shown), springs (not shown), spring-fixing portions (not shown), a rotation-assisting plate 315B, a rotation-assisting movable member 317B, two stoppers 216B, and a cover member 243B. A portion of an inner wall of the second outer wall portion 219B, which is irradiated with light reflected on the reflective portions 2121B during non-fitting, is constituted by a scattering member.

It should be noted that the optical communication connector 310B can include a positioning member for positioning each member, a protection member for protecting each member, a casing for supporting each member, and the like as appropriate besides the above-mentioned configuration.

The optical component 311B includes a collimating lens 111B. The optical component 311B retains the end portion of the optical transmission path 202B inside the electronic apparatus 100. The optical component 311B is configured to be capable of emitting collimated light adjusted to be parallel by the collimating lens 111B or allowing collimated light from an optical component 311A of the counterpart connector to be incident upon the optical component 311B.

The optical component 311B is provided with an optical transmission path insertion hole (not shown) into which an end portion of an optical transmission path 202B is inserted and an inner space 3113B into which pins are inserted and the rotation-assisting plate 315B and the rotation-assisting movable member 317B are movable. The inner space 3113B is spatially separated from the optical transmission path insertion hole.

Moreover, apertures 3114B into which the pins are inserted are provided in a surface of the optical component 311B, in which the collimating lens 111B is provided, and the inner space 3113B are spatially connected to the outside of the optical component 311B through the apertures 3114B. The apertures 3114B are arranged on both sides with the collimating lens 111B interposed therebetween one by one.

The end portion of the optical transmission path 202B is supported inside such that the optical axes of the optical transmission path 202B and the collimating lens 111B are aligned with each other through the optical transmission path insertion hole inside the optical component 311B.

The movable member 212B has a configuration similar to that of the movable member 212B according to the second embodiment. Light emitted from the optical component 311B is incident upon the movable member 212B. Moreover, light, which is emitted from the optical component 311A of the counterpart connector 310A and passes through a movable member 212A, is incident upon the movable member 212B. The movable member 212B is configured to be movable between a first state taken during non-fitting and a second state taken during fitting.

The movable member-rotating shaft, the springs, and the spring-fixing portions (not shown) have configurations similar to those of the first embodiment and configures the movable member to be rotatable as in the first embodiment. The spring-fixing portions are fixed to the second outer wall portion 219B inside the second outer wall portion 219B.

The rotation-assisting movable member 317B has a plate shape whose plane shape is rectangular. The rotation-assisting movable member 317B is positioned inside the inner space 3113B. The rotation-assisting movable member 317B is configured to be rotatable in the inner space 3113B about a rotation shaft 3171B provided in the rotation-assisting movable member 317B and fixed inside the inner space 3113B.

A lower portion of the rotation-assisting movable member 317B is bonded and fixed to the rotation-assisting plate 315B. The rotation-assisting movable member 317B is inclined such that the upper portion is closer to the movable member 212B due to an urging member (not shown) during non-fitting.

In the rotation-assisting movable member 317B, the positioning pins 242 are brought into contact with the rotation-assisting movable member 317B due to insertion of the positioning pins 242 into the inner space 3113B. The positioning pins 242 are further inserted, such that the rotation-assisting movable member 317B rotates and moves about the rotation shaft 3171B.

Although the rotation-assisting movable member 317B is inclined such that the upper portion is closer to the movable member 212B during non-fitting, the rotation-assisting movable member 317B is rotated and inclined such that the upper portion is spaced apart from the movable member 212B due to insertion of the positioning pins 242 and the lower portion gets closer to the movable member 212B.

Due to the rotational movement of the rotation-assisting movable member 317B, the rotation-assisting plate 315B is pushed toward the movable member 212B. In such a manner that the rotation-assisting plate 315B is pushed and moves, the rotation-assisting plate 315B pushes the lower portion of the movable member 212B. Accordingly, the movable member 212B rotates and moves from the first state to the second state.

The optical communication connector 310A provided on the plug side includes a first outer wall portion 218A, a second outer wall portion 219A, the optical component 311A, the movable member 212A, a movable member-rotating shaft (not shown), springs (not shown), spring-fixing portions (not shown), a rotation-assisting plate 315A, a rotation-assisting movable member 317A, two stoppers 216A, a cover member 243A, and coil springs 343 that are elastic members.

A portion of an inner wall of the second outer wall portion 219A, which is irradiated with light reflected on reflective portions 2121A during non-fitting, is constituted by a scattering member and the second outer wall portion 219A functions as a scattering portion.

It should be noted that the optical communication connector 310A can include a positioning member for positioning each member, a protection member for protecting each member, a casing for supporting each member, and the like as appropriate besides the above-mentioned configuration.

The optical component 311A includes a collimating lens 111A. It should be noted that in FIG. 13, the collimating lens 111A is not shown in the figure because the collimating lens 111A is hidden by the positioning pins 242. The optical component 311A retains the end portion of the optical transmission path 202A inside the cable main body 201.

The optical component 311A is configured to be capable of emitting collimated light adjusted to be parallel by the collimating lens 111A or allowing the collimated light from the collimating lens 111B of the optical component 311B of the counterpart connector to be incident upon the optical component 311A.

The optical component 311A is provided with an optical transmission path insertion hole (not shown) into which an end portion of an optical transmission path 202B is inserted and an inner space 3113A. The inner space 3113A is spatially separated from the optical transmission path insertion hole. In the inner space 3113A, the positioning pins 242 are retained to be movable in one direction and the rotation-assisting plate 315A and the rotation-assisting movable member 317A are configured to be movable.

The one ends of the positioning pins 242 are fixed to the coil springs 343 that are the elastic members and the positioning pins 242 are movable by extraction and contraction of the coil springs 343 inside the inner space 3113A in insertion and removal directions of the positioning pins 242. The coil springs 343 are provided in a contraction state during fitting and the coil springs 343 are held in a natural state during non-fitting. The other ends of the positioning pins 242 are end portions of the positioning pins 242, which are inserted into the inner space 3113B of the optical communication connector 310B.

Moreover, apertures 3114A into which the pins are inserted are provided in a surface of the optical component 311A in which the collimating lens 111A is provided and the inner space 3113A is spatially connected to the outside of the optical component 311A through the apertures 3114A. The apertures 3114A are arranged on both side with the collimating lens interposed therebetween one by one.

The end portion of the optical transmission path 202A which is retained by the optical component 311A is supported inside the optical component 311A through the optical transmission path insertion hole such that the optical axis of the collimating lens 111A is aligned.

The movable member 212A has a configuration similar to that of the movable member 212B and the movable member 212A includes the reflective portions 2121A and a transmissive portion 2122A in a flat surface orthogonal to a direction of the thickness.

The transmissive portion 2122A is constituted by a light-transmissive member. The transmissive portion 2122A includes an incident surface upon which light is incident and an emission surface from which light is emitted, the incident surface and the emission surface being arranged in parallel to be opposite to each other. Light perpendicularly incident upon the incident surface is refracted and is emitted from the emission surface.

The reflective portions 2121A each have a surface mirror-finished, for example, to be configured to reflect light on the surface.

The incident light 40 emitted from the optical component 311A is incident upon the movable member 212A. Moreover, light 42, which is emitted from the optical component 311B of the optical communication connector 310B that is the counterpart connector and passes through the movable member 212B, is incident upon the movable member 212A. The movable member 212A is configured to be movable between a first state taken during non-fitting to the optical communication connector 310B that is the counterpart connector and a second state taken during fitting to the optical communication connector 310B.

The movable member-rotating shaft, the springs, and the spring-fixing portions (not shown) have configurations similar to those of the first embodiment and configures the movable member to be rotatable as in the first embodiment. The spring-fixing portions are fixed to the second outer wall portion 219A inside the second outer wall portion 219A.

The movable member 212A is configured such that the incident light 40 from the optical component 311A is obliquely incident upon the flat surface of the movable member 212A in the first state during non-fitting. Furthermore, the reflective portions 2121A of the movable member 212A are arranged such that the incident light 40 from the optical component 311A is incident upon the reflective portions 2121A in the first state.

The movable member 212A is configured such that the flat surface of the movable member 212A is perpendicular to the incident light 40 from the optical component 311A in the second state during fitting. The transmissive portion 2122A of the movable member 212A is arranged such that light from the optical component 311A or 311B passes through the transmissive portion 2122A in the second state.

The rotation-assisting movable member 317A has a plate shape whose plane shape is rectangular. The rotation-assisting movable member 317A is positioned inside the inner space 3113A. The rotation-assisting movable member 317A is configured to be rotatable inside the inner space 3113A about a rotation shaft 3171A provided in the rotation-assisting movable member 317A and fixed inside the inner space 3113A.

The rotation-assisting movable member 317A is urged and inclined by the coil springs 343 such that the upper portion gets closer to the optical communication connector 310B that is the counterpart connector during non-fitting.

The rotation-assisting plate 315A is bonded and fixed to the lower portion of the rotation-assisting movable member 317A. By inserting the positioning pins 242 into the inner space 3113B, the ends of the positioning pins 242 are brought into contact with the upper portion of the rotation-assisting movable member 317B and the rotation-assisting movable member 317B rotates and moves due to the insertion of the positioning pins 242.

Due to the rotational movement of the rotation-assisting movable member 317B, the movable member 212B rotates and moves from the first state to the second state. Furthermore, when the positioning pins 242 are inserted, the ends of the positioning pins 242 are brought into contact with an inner surface of the inner space 3113B of the optical component 311B and are pushed back in a direction opposite to the insertion direction, and the coil springs 343 are provided in a contraction state. It should be noted that although the extension and contraction of the coil springs 343 cause the positioning pins 242 to move in this embodiment, the pin-moving mechanism is not limited to the springs.

The rotation-assisting movable member 317A is fixed to the one end portions of the positioning pins 242 and rotate about the rotation shaft 3171A along with the movement of the positioning pins 242. Although the rotation-assisting movable member 317A is inclined such that the upper portion is closer to the optical communication connector 310B in the state during non-fitting, the rotation-assisting movable member 317A is inclined such that the upper portion is spaced apart from the optical communication connector 310B and the lower portion gets closer to the optical communication connector 310B with the rotation-assisting movable member 317A interlocked with the movement of the pins 342.

With the rotational movement of the rotation-assisting movable member 317A, the rotation-assisting plate 315A is pushed toward the movable member 212A by the lower portion of the rotation-assisting movable member 317A. In such a manner that the rotation-assisting plate 315A is pushed and moves, the rotation-assisting plate 315B pushes the lower portion of the movable member 212A. Accordingly, the movable member 212A rotates and moves from the first state to the second state.

The state in which the optical communication connector 310A and the optical communication connector 310B push each other due to the coil springs 343 is retained by a lock member (not shown) and the optical junction state can be provided.

As described above, the movable members of both the optical communication connectors may be configured to be rotatable through the pins and the springs.

In this embodiment, the optical communication connector 310A (310B) is held in the first state in which the movable member 212A (212B) is inclined during non-fitting. Accordingly, the incident light 40 emitted from the optical component 311A (311B) is reflected on the reflective portions 2121A (2121B) of the movable member 212A (212B).

The light 41 reflected on reflective portion 2121A (2121B) travels on an optical path toward the inside of the optical communication connector 310A (310B), is incident upon and scattered on the region of the inner wall of the second outer wall portion 219A (219B), which is constituted by scattering member, and is not directly emitted to the outside of the optical communication connector 310A (310B).

Therefore, even if light, which is not optically coupled between the optical communication connectors 310A and 310B and leaks, is emitted to the outside, the light is emitted to the outside with the power of the light attenuated, and the safety for the work is enhanced.

It should be noted that in this embodiment, the pin insertion holes are provided in the optical communication connector on the receptacle side and the pins are provided in the optical communication connector on the plug side, though those may be inverted.

Fourth Embodiment

Next, an optical communication connector according to a fourth embodiment will be described with reference to FIGS. 14 and 15. Hereinafter, configurations similar to those of the above-mentioned embodiments will be denoted by similar reference signs and descriptions thereof will be omitted in some cases.

An optical communication connector set 410 including an optical communication connector 410A and an the optical communication connector 410B, which will be described in this embodiment, can be used for optical junction of the electronic apparatus 100 with the optical communication cable 200 as in the optical communication connector set 10 according to the first embodiment.

The optical communication connector 410A and the optical communication connector 410B have the same configuration except for a difference in size of first outer wall portion that constitutes a part of each of them.

Figure 14:
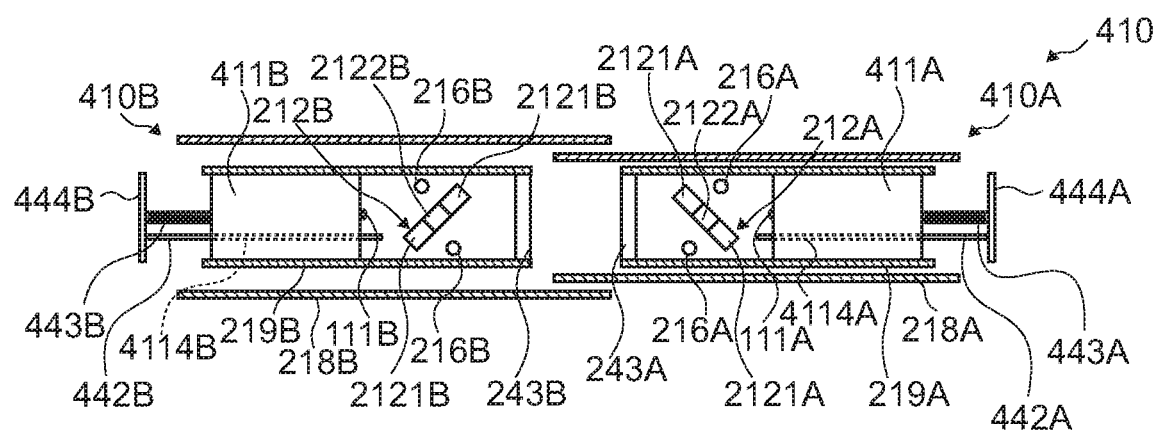
FIG. 14 A cross-sectional view showing of an optical communication connector set according to a fourth embodiment in a non-fitting state.

FIG. 14 is an enlarged cross-sectional view of the optical communication connector set during non-fitting. FIG. 15 is an enlarged cross-sectional view of the optical communication connector set during fitting.

The optical communication connector 410A (410B) includes a first outer wall portion 218A (218B), a second outer wall portion 219A (219B), an optical component 411A (411B), a movable member 212A (212B), a movable member-rotating shaft (not shown), springs (not shown), spring-fixing portions (not shown), two stoppers 216A (216B), a cover member 243A (243B), a pin 442A (442B), a coil spring 443A (443B) as an elastic member, and a fixing plate 444A (444B).

It should be noted that the optical communication connector 410A (410B) can include a positioning member for positioning each member, a protection member for protecting each member, a casing for supporting each member, and the like as appropriate besides the above-mentioned configuration.

The optical component 411A (411B) includes a collimating lens 111A (111B). The optical component 411A (411B) retains an end portion of an optical transmission path (not shown) inside the cable main body 201 (the electronic apparatus 100). The optical component 411A (411B) is configured to be capable of emitting collimated light adjusted to be parallel by the collimating lens 111A (111B) or allowing collimated light from the optical component 411A (411B) of the counterpart connector to be incident upon the optical component 411A (411B).

The optical component 411A (411B) is provided with an optical transmission path insertion hole (not shown) into which the end portion of the optical transmission path is inserted and a pin insertion hole 4114A (4114B) into which the pin 442A (442B) is inserted. The pin insertion hole 4114A (4114B) is spatially separated from the optical transmission path insertion hole. The pin insertion hole 4114A (4114B) is a through-hole extending from one end surface to the other end surface of the optical component 411A (411B).

The fixing plate 444A (444B) is fixed to the first outer wall portion 218A (218B). The coil spring 443A (443B) capable of extension and contraction in the insertion and removal directions of the optical communication connector and the pin 442A (442B) are fixed to the fixing plate 444A (444B).

The one end of the coil spring 443A (443B) is fixed to the fixing plate 444A (444B) and the other end is fixed to the optical component 411A (411B).

The pin 442A (442B) is supported by the pin insertion hole 4114A (4114B) to be movable in the insertion and removal directions inside the pin insertion hole 4114A (4114B) of the optical component 411A (411B).

The pin 442A (442B) protrudes from a surface in which the collimating lens 111A (111B) is disposed and the length of protrusion from the optical component 411A (411B) changes along with extension and contraction of the coil spring 443A (443B). The pin 442A (442B) is configured to be capable of being brought into contact with the movable member 212A (212B).

By inserting the optical communication connector 410A into the optical communication connector 410B, the coil springs 443A and 443B are provided in a contraction state. Due to urging force of the respective springs, the cover member 243A of the optical communication connector 410A is brought into contact with the cover member 243B of the optical communication connector 410B and the two optical communication connectors are fitted to each other and are held in an optical junction state.

The end portion of the optical transmission path of the cable main body 201 (the electronic apparatus 100) is supported inside such that the optical axes of the optical transmission path and the collimating lens 111A (111B) are aligned with each other through the optical transmission path insertion hole inside the optical component 411A (411B).

Light emitted from the optical component 411A (411B) is incident upon the movable member 212A (212B). In addition, light, which is emitted from the optical component 411B (411A) of the optical communication connector 410B (410A) that is the counterpart connector and passes through the movable member 212B (212A), is incident upon the movable member 212A (212B). The movable member 212A (212B) is configured to be movable between a first state taken during non-fitting to the optical communication connector 410B (410A) that is the counterpart connector and a second state taken during fitting to the optical communication connector 410B (410A).

The movable member 212A (212B) is configured such that light from the optical component 411A (411B) is obliquely incident upon the flat surface of the movable member 212A (212B) in the first state during non-fitting. Furthermore, the reflective portions 2121A (2121B) of the movable member 212A (212B) is arranged such that light from the optical component 411A (411B) is incident upon the reflective portions 2121A (2121B) in the first state. During non-fitting, the coil spring 443A (443B) is held in the natural state and pushing force of the pin 442A (442B) does not act on the movable member 212A (212B), and thus the movable member 212A (212B) keeps the first state in which it is inclined.

The movable member-rotating shaft, the springs, and the spring-fixing portions (not shown) have configurations similar to those of the first embodiment and configures the movable member to be rotatable as in the first embodiment. The spring-fixing portions are fixed to the second outer wall portion 219A (219B) inside the second outer wall portion 219A (219B).

The movable member 212A (212B) is configured such that the flat surface of the movable member 212A (212B) is perpendicular to incident light from the optical component 411A (411B) in the second state during fitting. The transmissive portion 2122A (2122B) of the movable member 212A (212B) is arranged such that light from the optical component 411A or 411B passes through the transmissive portion 2122A (2122B) in the second state.

Figure 15:
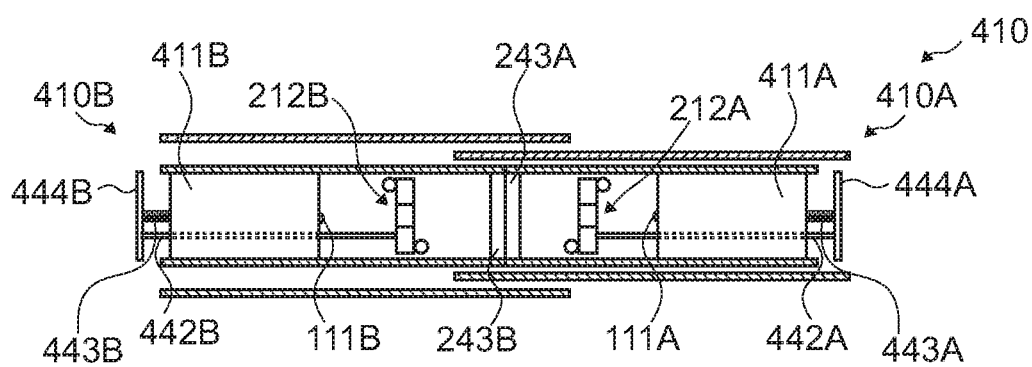
FIG. 15 A cross-sectional view showing a fitting state of the optical communication connector set in FIG. 14.

As shown in FIG. 15, when the optical communication connector 410A on the plug side is inserted into the optical communication connector 410B on the receptacle side, the fixing plates 444A and 444B respectively fixed to the first outer wall portion 218A and the first outer wall portion 218B move to approach each other.

Accordingly, by both the optical communication connectors 410A and 410B pushing each other, the coil springs 443A and 443B are provided in a contraction state. Along with this, the distance between the optical component 411A (411B) and the fixing plate 444A (444B) is shortened, the length of a site of the pin 442A (442B), which protrudes from the optical component 411A (411B), and the lower portion of the movable member 212A (212B) is pushed by the pin 442A (442B). Accordingly, the movable member 212A (212B) rotates about the movable member-rotating shaft.

With the rotation, the movable member 212A (212B) moves from the first state in which its flat surface is oblique to the optical axis of the incident light to the second state in which its flat surface is perpendicular to the optical axis of the incident light. By the movable member 212B taking the second state, the movable member 212A of the optical communication connector 410A and the movable member 212B of the optical communication connector 410B are positioned in parallel with each other during fitting.

In this embodiment, the optical communication connector 410A (410B) takes the first state in which the movable member 212A (212B) is inclined during non-fitting. Accordingly, light from the optical component 411A (411B) is incident upon the reflective portions 2121A (2121B) of the movable member 212A (212B) and is reflected on the reflective portions 2121A (2121B).

The light 41 reflected on the reflective portion 2121A (2121B) travels on an optical path toward the inside of the optical communication connector 410A (410B), is incident upon and scattered on the region of the inner wall of the second outer wall portion 219A (219B), which is constituted by a scattering member, and is not directly emitted to the outside of the optical communication connector 410A (410B). Therefore, even if light, which is not optically coupled between the optical communication connectors 410A and 410B and leaks, is emitted to the outside, the light is emitted to the outside with the power of the light attenuated, and the safety for the work is enhanced.

As described above, the pins and the springs may be used to configure the movable member to be rotatable. In the configuration according to this embodiment, the elastic member is extended and contracted due to fitting to the counterpart connector, and the length of protrusion of the pin from the optical component changes along with the extension and contraction of this elastic member. Due to the elastic member provided in the contraction state, the distance between the pins protruding from the optical component and the movable member is shortened and the pins are brought into contact with the movable member and push the movable member. As a result, the movable member can be rotated and moved from the first state to the second state.

In such a configuration, each connector is not brought into direct contact with the movable member of the counterpart connector and the movable member can be rotated by a connector's own inside mechanism. Therefore, it is unnecessary to provide the cover member with the hole into which the pin is inserted and entry of dust and the like is further suppressed, and thus the present technology is especially suitable for an optical communication connector set for consumers, which is relatively frequently inserted and removed.

Fifth Embodiment

Next, an optical communication connector according to a fifth embodiment will be described with reference to FIGS. 16 and 17. Hereinafter, configurations similar to those of the above-mentioned embodiments will be denoted by similar reference signs and descriptions thereof will be omitted in some cases.

An optical communication connector set 510 including an optical communication connector 510A and an optical communication connector 510B, which will be described in this embodiment, can be used for optical junction of the electronic apparatus 100 with the optical communication cable 200 as in the optical communication connector set 10 according to the first embodiment.

Figure 16:
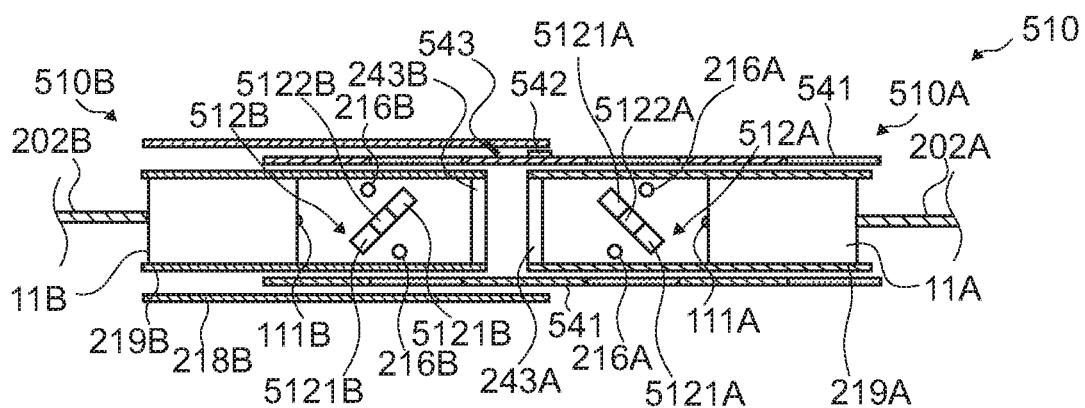
FIG. 16 A cross-sectional view showing a non-fitting state of an optical communication connector set according to a fifth embodiment.

FIG. 16 is an enlarged cross-sectional view of the optical communication connector set during non-fitting. FIG. 17 is an enlarged cross-sectional view of the optical communication connector set during fitting.

This embodiment is different mainly in configuration from the above-mentioned embodiments in that electromagnets are used for the rotating mechanism for the movable member.

The optical communication connector 510A includes electromagnets 541, an electrode 542, a second outer wall portion 219A, an optical component 11A, a movable member 512A, a movable member-rotating shaft (not shown), springs (not shown), spring-fixing portions (not shown), two stoppers 216A, and a cover member 243A.

It should be noted that the optical communication connector 510A can include a positioning member for positioning each member, a protection member for protecting each member, a casing for supporting each member, and the like as appropriate besides the above-mentioned configuration.

The optical component 11A includes a collimating lens 111A. The optical component 11A retains the end portion of the optical transmission path 202A inside the cable main body 201. The optical component 11A is configured to be capable of emitting collimated light adjusted to be parallel by the collimating lens 111A or allowing collimated light from the optical component 11A that is the counterpart connector to be incident upon the optical component 11A.

The optical component 11A is provided with an optical transmission path insertion hole (not shown) into which the end portion of the optical transmission path 202A is inserted.

The movable member 512A has a plate shape. The movable member 512A includes non-light-transmissive portions 5121A and a transmissive portion 5122A in a flat surface orthogonal to a direction of the thickness.

The transmissive portion 5122A is constituted by a light-transmissive member. The transmissive portion 5122A includes an incident surface upon which light is incident and an emission surface from which light is emitted, the incident surface and the emission surface being arranged in parallel to be opposite to each other. Light perpendicularly incident upon the incident surface is refracted and is emitted from the emission surface. The non-light-transmissive portions 5121A are constituted by movable magnets.

Light emitted from the optical component 11A is incident upon the movable member 512A. The movable member 512A is configured to be movable between a first state taken during non-fitting and a second state taken during fitting.

The movable member 512A is configured such that light from the optical component 11A is obliquely incident upon the flat surface of the movable member 512A in the first state during non-fitting. Furthermore, the non-light-transmissive portions 5121A of the movable member 512A is arranged such that light from the optical component 11A is incident upon the non-light-transmissive portions 5121A constituted by the movable magnets in the first state.

The movable member-rotating shaft, the springs, and the spring-fixing portions (not shown) have configurations similar to those of the first embodiment and configures the movable member to be rotatable as in the first embodiment. The spring-fixing portions are fixed to the second outer wall portion 219B inside the second outer wall portion 219B.

The movable member 512A is configured such that light from the optical component 11B is obliquely incident upon the flat surface of the movable member 512A in the first state during non-fitting. Furthermore, in the first state, the non-light-transmissive portions 5121A are arranged such that light from the optical component 11A is incident upon the non-light-transmissive portions 5121A of the movable member 512A.

The movable member 512A is configured such that the flat surface of the movable member 512A is perpendicular to incident light from the optical component 11A in the second state during fitting. In the second state, the transmissive portion 5122A of the movable member 512A is arranged such that light from the optical component 11A or 11B incident upon the transmissive portion 5122A.

The electromagnets 541 are respectively provided above and below the optical component 11A while sandwiching the optical component 11A covered with the second outer wall portion 219A. The electrode 542 is provided on a side surface of the electromagnet 541. The electromagnets 541 generate magnetic force due to electric conduction between the electrode 542 and a terminal 543 provided the optical communication connector 510B, which will be described later.

The optical communication connector 510B includes a first outer wall portion 218B, a terminal 543, a second outer wall portion 219B, an optical component 11B, a movable member 512B, a movable member-rotating shaft (not shown), springs (not shown), spring-fixing portions (not shown), two stoppers 216B, and a cover member 243B.

It should be noted that the optical communication connector 510B can include a positioning member for positioning each member, a protection member for protecting each member, a casing for supporting each member, and the like as appropriate besides the above-mentioned configuration.

The movable member 512B has a configuration similar to that of the movable member 512A and is configured to be rotatable through a similar rotating mechanism. The movable member 512B is configured to be movable between a first state taken during non-fitting and a second state taken during fitting.

The terminal 543 is arranged on an inner side surface of the first outer wall portion 218B. The terminal 543 is configured to be capable of being brought into contact with and electrically connected to the electrode 542 of the optical communication connector 510A when inserting the optical communication connector 510A into the optical communication connector 510B and fitting both to each other such that optical junction is established.

As shown in FIG. 17, when the optical communication connector 510A is inserted into the optical communication connector 510B and the terminal 543 is brought into contact with the electrode 542 and electric conduction is established, the electromagnets 541 generate magnetic force. Accordingly, the non-light-transmissive portions 5121A (5121B) of the movable member 512A (512B), which include the movable magnets, are adsorbed to the electromagnets 541 and the movable member 512A (512B) rotates. The movable member 512A (512B) rotates and moves to take a second state in which light from the optical component 11A (11B) is perpendicularly incident upon its flat surface.

In this embodiment, the optical communication connector 510A (510B) takes a first state in which the movable member 512A (512B) is inclined during non-fitting. Accordingly, the light emitted from the optical component 11A (11B) is reflected or absorbed on the non-light-transmissive portions 5121A (5121B) of the movable member 512A (512B), which include the movable magnets.

In a case where light is reflected on the non-light-transmissive portions 5121A (5121B), the reflected light 41 travels on an optical path toward the inside of the optical communication connector 510A (510B), is incident upon and scattered on the region of the inner wall of the second outer wall portion 219A (219B), which is constituted by scattering member, and is not directly emitted to the outside of the optical communication connector 210A (210B). Therefore, even if light, which is not optically coupled between the optical communication connectors 210A and 210B and leaks, is emitted to the outside, the light is emitted to the outside with the power of the light attenuated, and the safety for the work is enhanced.

Moreover, when the light is absorbed by the non-light-transmissive portions 5121A (5121B), the light is emitted to the outside of the optical communication connector 510B with the power of the light attenuated due to the absorption of the light. Accordingly, the safety for the work is enhanced.

It should be noted that the stoppers may be constituted by magnets and the magnets may be made to have the same polarity as the movable magnets so as to provide the first state in which the movable member is inclined while those are repelling each other during non-fitting.

As described above, the movable member may be configured to be rotatable through the electromagnets. In this embodiment, the movable member is rotatable through the electromagnets, and thus the movable member can be rotated at a position at which both the connectors do not interfere with each other. Therefore, it is unnecessary to provide the cover member with the hole or the like into which the pin is inserted and entry of dust and the like is further suppressed, and thus the present technology is especially suitable for an optical communication connector set for consumers, which is relatively frequently inserted and removed.

Other Embodiments

Although sixth to sixteenth embodiments will be described hereinafter, in any of the embodiments, in a first state taken by the movable member during non-fitting, light incident upon the movable member from the optical component becomes light which travels on an optical path toward an inner side surface of the second outer wall portion due to the movable member, and the power of the light emitted to the outside of the optical communication connector is attenuated. In a second state taken by the movable member during fitting, light incident upon the movable member from the optical component passes through the movable member and is emitted to the outside of the optical communication connector as it is.

Accordingly, during non-fitting, light is emitted to the outside such that the power of the light is attenuated to be lower than the power of the light during fitting. Accordingly, the safety for the work is enhanced.

Moreover, in each of the sixth to sixteenth embodiments below, as the rotating mechanism for the movable member, the mechanism of rotating the movable member in such a manner that the movable members respectively provided in both the connectors are brought into direct contact with each other, which has been described in the first embodiment, the mechanism of rotating the movable member by using the pins, which has been described in each of the second to fourth embodiments, the mechanism of rotating the movable member by using the electromagnets, which has been described in the fifth embodiment, or the like can be used.

In each of the sixth to sixteenth embodiments below, the description will be given by exemplifying a case where the cover member is used.

Moreover, in each of the sixth to sixteenth embodiments, the optical communication connector on the receptacle side and the optical communication connector on the plug side which are fitted to each other have a similar movable member configuration. In each of the above-mentioned embodiments, in order to distinguish one from the other of the pair of optical communication connectors, the descriptions have been given by adding A or B after the reference signs. However, in the following embodiments, the descriptions will be given with A and B omitted.

In each of the sixth to the sixteenth embodiments below, configurations similar to those of the above-mentioned embodiments will be denoted by similar reference signs and descriptions thereof will be omitted in some cases, and a configuration of the movable member will be mainly described. Moreover, the illustration and descriptions of the rotating mechanism will be omitted.

In each of the above-mentioned embodiments, the example in which the plate-shaped member whose flat surface is rectangular is used as the movable member has been shown, though the shape of the movable member is not limited thereto. The movable member only needs to be configured such that the optical path of the incident light changes and light is emitted to the outside with the power of the light attenuated in the first state and the movable member only needs to be configured to allow light to pass therethrough and emit the light to the outside of the optical communication connector in the second state.

Hereinafter, modified examples of the shape of the movable member will be described as the sixth to ninth embodiments. In any of the embodiments, the movable member is capable of rotating and taking the first state and the second state.

Sixth Embodiment

Referring to FIGS. 18A and 18B, an optical communication connector according to a sixth embodiment will be described. FIGS. 18A and 18B is a schematic cross-sectional view of an optical communication connector 610, FIG. 18A shows a state during non-fitting, and FIG. 18B shows a state during fitting.

As shown in FIGS. 18A and 18B, the optical communication connector 610 includes a first outer wall portion (not shown), a second outer wall portion 219, an optical component 611, a movable member 612, a rotating mechanism for the movable member (not shown), stoppers (not shown), and a cover member (not shown).

The movable member 612 includes a pair of reflective portions 6121 that are non-light-transmissive portions and a transmissive portion 6122. Any of the reflective portions 6121 and the transmissive portion 6122 has a rectangular parallelepiped shape. The pair of reflective portions 6121 are provided to sandwich the transmissive portion 6122.

A surface of the movable member 611 upon which the incident light 40 is incident when the incident light 40 from the optical component 611 is incident upon the movable member 612 after the optical communication connector 610 is fitted to a counterpart optical communication connector (not shown) is a surface in which the transmissive portion 6122 protrudes than the reflective portions 6121. On the other hand, a surface opposite to the surface of the movable member 612 upon which the incident light 40 is incident is a flat surface.

As shown in FIG. 18A, the movable member 612 is positioned such that the flat surface is oblique to the optical axis 40a of the incident light 40 from the optical component 611 in the first state. Accordingly, the incident light 40 is obliquely incident upon a side surface of the protruding transmissive portion 6122, and light emitted from the transmissive portion 6122 travels on an optical path toward the reflective portions 6121 and is reflected on surfaces of the reflective portions 6121. The reflected light 41 travels on an optical path toward an inner wall of the second outer wall portion 219.

The reflected light 41 is incident upon and scattered on the region of the inner wall of the second outer wall portion 219, which is constituted by scattering member, and is not directly emitted to the outside of the optical communication connector 610. Therefore, even if light, which is not optically coupled between the two optical communication connectors during fitting of both and leaks, is emitted to the outside, the light is emitted to the outside with the power of the light attenuated, and the safety for the work is enhanced.

On the other hand, as shown in FIG. 18B, the movable member 612 is positioned such that the flat surface is perpendicular to the optical axis 40a of the incident light 40 in the second state. Accordingly, the incident light 40 from the optical component 611 is perpendicularly incident upon the surface of the protruding transmissive portion 6122, passes through the transmissive portion 6122, and is emitted from the transmissive portion 6122. The emitted light 42 passing through the transmissive portion 6122 is directly emitted to the outside of the optical communication connector 610 and is incident upon the counterpart connector (not shown).

Seventh Embodiment

Figure 19A:
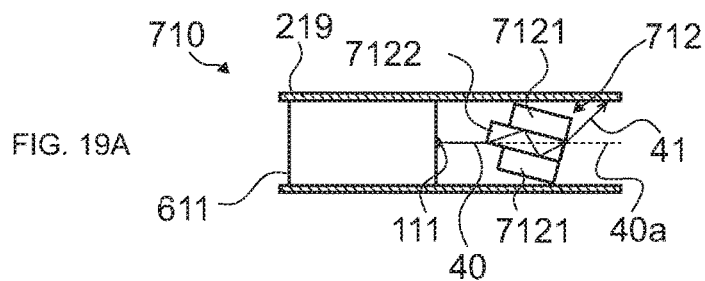
FIGS. 19A and 19B A cross-sectional view showing a modified example of a movable member according to a seventh embodiment.
Figure 19B:
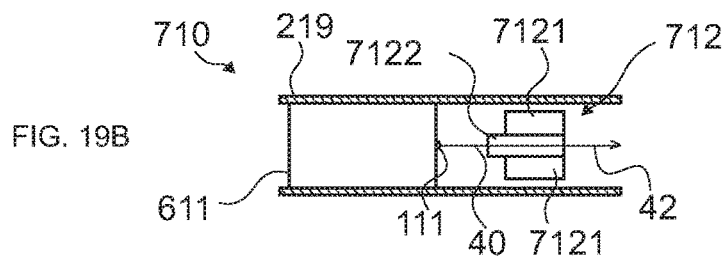

Next, an optical communication connector according to a seventh embodiment will be described with reference to FIGS. 19A and 19B. FIGS. 19A and 19B are schematic cross-sectional views of an optical communication connector 710, FIG. 19A shows a state during non-fitting, and FIG. 19B shows a state during fitting.

As shown in FIGS. 19A and 19B, the optical communication connector 710 includes a first outer wall portion (not shown), a second outer wall portion 219, an optical component 611, a movable member 712, a rotating mechanism for the movable member (not shown), stoppers (not shown), and a cover member (not shown).

The movable member 712 includes a pair of reflective portions 7121 that are non-light-transmissive portions and the transmissive portion 7122. Any of the reflective portions 7121 and the transmissive portion 7122 has a rectangular parallelepiped shape. The pair of reflective portions 7121 is provided to sandwich the transmissive portion 7122.

As in the movable member 612 according to the sixth embodiment, a surface of the movable member 712, upon which light is emitted during fitting, is a flat surface and a surface opposite to the flat surface is a surface from which the transmissive portion 7122 protrudes. The movable member 712 according to the seventh embodiment generally has a larger thickness orthogonal to the flat surface than that of the movable member 612 according to the sixth embodiment.

As shown in FIG. 19A, the movable member 712 is positioned such that the flat surface is oblique to the optical axis 40a of the incident light 40 in the first state. Accordingly, the incident light 40 from the optical component 611 is obliquely incident upon the surface of the transmissive portion 7122 and is emitted from the transmissive portion 7122 while being reflected on the reflective portions 7121 inside the transmissive portion 7122.

The light 41 emitted from the transmissive portion 7122 travels on an optical path toward an inner side surface of the second outer wall portion 219. Therefore, the incident light 40 from the optical component 611 is prevented from being directly emitted to the outside of the optical communication connector 710.

On the other hand, as shown in FIG. 19B, the movable member 712 is positioned such that the flat surface is perpendicular to the optical axis 40a of the incident light 40 in the second state. Accordingly, the incident light 40 from the optical component 611 is perpendicularly incident upon the surface of the transmissive portion 7122, passes through the transmissive portion 7122, and is emitted from the transmissive portion 7122. The light 42 passing through and emitted from the transmissive portion 7122 is directly emitted to the outside of the optical communication connector 710 and is incident upon the counterpart connector (not shown).

Eighth Embodiment

Figure 20A:
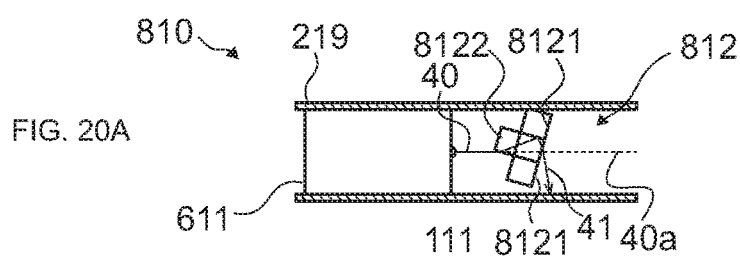
FIGS. 20A and 20B A cross-sectional view showing a modified example of a movable member according to an eighth embodiment.
Figure 20B:
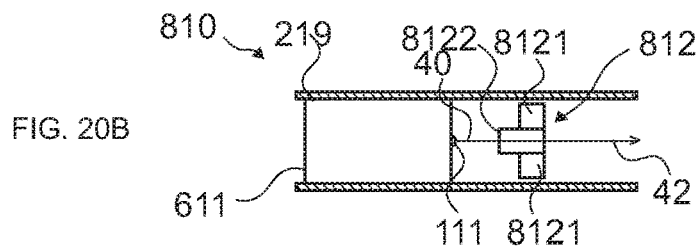

Next, an optical communication connector according to an eighth embodiment will be described with reference to FIGS. 20A and 20B. FIGS. 20A and 20B are schematic cross-sectional views of an optical communication connector 810, FIG. 20A shows a state during non-fitting, and FIG. 20B shows a state during fitting.

As shown in FIGS. 20A and 20B, the optical communication connector 810 includes a first outer wall portion (not shown), a second outer wall portion 219, an optical component 611, a movable member 812, a rotating mechanism for the movable member (not shown), stoppers (not shown), and a cover member (not shown).

The movable member 812 includes a pair of reflective portions 8121 that are non-light-transmissive portions and a transmissive portion 8122. Any of the reflective portions 8121 and the transmissive portion 8122 has a rectangular parallelepiped shape. The pair of reflective portions 8121 is provided to sandwich the transmissive portion 8122.

As in the movable member 612 according to the sixth embodiment, a surface of the movable member 812, from which light is emitted during fitting, includes a flat surface and a surface opposite to the flat surface is a surface from which the transmissive portion 8122 protrudes. The movable member 812 according to the eighth embodiment generally has a larger thickness orthogonal to the flat surface than that of the movable member 612 according to the sixth embodiment while the movable member 812 according to the eighth embodiment has a smaller thickness than that of the movable member 712 according to the seventh embodiment.

As shown in FIG. 20A, the movable member 812 is positioned such that the flat surface is oblique to the optical axis of the incident light 40a in the first state. Accordingly, the incident light 40 from the optical component 611 is obliquely incident upon the surface of the transmissive portion 8122, is reflected on the reflective portions 8121 inside the transmissive portion 8122, and is emitted from the transmissive portion 8122.

In this embodiment, the optical path length of light passing through the transmissive portion 8122 is shorter as compared to the movable member 712 according to the seventh embodiment. As described above, even with the movable member having a similar shape, the optical path of light emitted from the movable member can be adjusted by changing its dimension.

The light 41 emitted from the transmissive portion 8122 travels on an optical path toward an inner side surface of the second outer wall portion 219. Therefore, the incident light 40 from the optical component 611 is prevented from being directly emitted to the outside of the optical communication connector 810.

On the other hand, as shown in FIG. 20B, the movable member 812 is positioned such that the flat surface is perpendicular to the optical axis 40a of the incident light 40 in the second state. Accordingly, the incident light 40 from the optical component 611 is perpendicularly incident upon the surface of the transmissive portion 8122, passes through transmissive portion 8122, and is emitted from the transmissive portion 8122. The light 42 passing through and emitted from the transmissive portion 8122 is directly emitted to the outside of the optical communication connector 810 and is incident upon the counterpart connector (not shown).

Ninth Embodiment

Figure 21A:
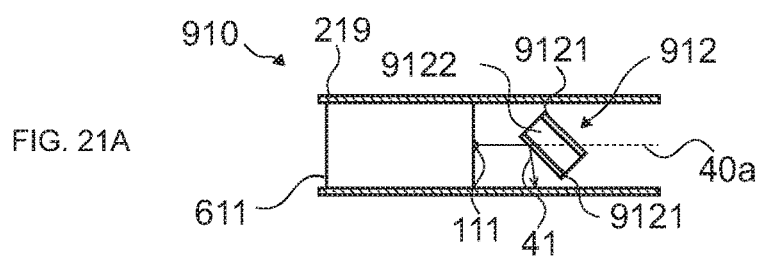
FIGS. 21A and 21B A cross-sectional view showing a modified example of a movable member according to a ninth embodiment.
Figure 21B:
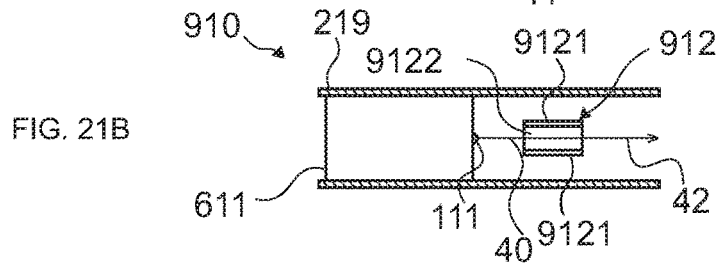

Next, an optical communication connector according to a ninth embodiment will be described with reference to FIGS. 21A and 21B. FIGS. 21A and 21B are schematic cross-sectional views of an optical communication connector 910, FIG. 21A shows a state during non-fitting, and FIG. 21B shows a state during fitting.

As shown in FIGS. 21A and 21B, the optical communication connector 910 includes a first outer wall portion (not shown), a second outer wall portion 219, an optical component 611, a movable member 912, a rotating mechanism for the movable member (not shown), stoppers (not shown), and a cover member (not shown).

The movable member 912 includes a pair of reflective portions 9121 that are non-light-transmissive portions and a transmissive portion 9122. The transmissive portion 9122 has a rectangular parallelepiped shape, the pair of reflective portions 9121 are respectively arranged on a pair of surfaces of the transmissive portion 9122, which are opposite to each other, to sandwich the transmissive portion 9122. The pair of surfaces of the transmissive portion 9122 on which the reflective portions 9121 are arranged are surfaces arranged to be orthogonal to the pair of surfaces opposite to each other upon which light is incident and from which the incident light is emitted during fitting.

As shown in FIG. 21A, the movable member 912 is positioned such that the reflective portions 9121 is oblique to the optical axis 40a of the incident light 40 in the first state. In the first state, the incident light 40 from the optical component 611 is incident upon and reflected on the reflective portions 9121. This reflected light 41 travels on an optical path toward an inner side surface of the second outer wall portion 219. Therefore, the incident light 40 from the optical component 611 is prevented from being directly emitted to the outside of the optical communication connector 910.

On the other hand, as shown in FIG. 21B, the movable member 912 is positioned such that the incident light 40 is perpendicular to the surface of the transmissive portion 9122 in the second state. Accordingly, the incident light 40 from the optical component 611 is perpendicularly incident upon the surface of the transmissive portion 9122, passes through the transmissive portion 9122, and is emitted from the transmissive portion 9122. The light 42 passing therethrough is directly emitted to the outside of the optical communication connector 910 and is incident upon the counterpart connector (not shown).

In each of the above-mentioned embodiments, the example in which the movable member is constituted by the non-light-transmissive portions and the light-transmissive portion and the optical path of the incident light is made different between the first state and the second state. In each of the tenth to twelfth embodiments below, the movable member is constituted by a prism that is a light-transmissive member and the shape of the movable member is adjusted such that the optical path differs due to light refraction.

In a case where the movable member is constituted by the prism, the shape of the movable member is configured such that the optical path is made different between the first state and the second state, the power of light emitted to the outside is attenuated in the first state, and light is not attenuated and passes through the optical connector and is emitted to the outside of the optical connector in the second state.

In each of the tenth to twelfth embodiments, the shape of the movable member constituted by the prism will be mainly described, configurations similar to those of the above-mentioned embodiments will be denoted by similar reference signs, and descriptions thereof will be omitted. Moreover, the rotating mechanism described in each of the above-mentioned embodiments can be used as the rotating mechanism for the movable member, and the illustration and description thereof will be omitted here. It should be noted that the shape of the movable member constituted by the prism is not limited to the configurations described in the embodiments.

The movable member constituted by the prism shown in each of the tenth to twelfth embodiments refracts and emits, in the first state, incident light obliquely to the optical axis of the incident light and emits the incident light to be aligned with the optical axis of the incident light in the second state.

Tenth Embodiment

Figure 22A:
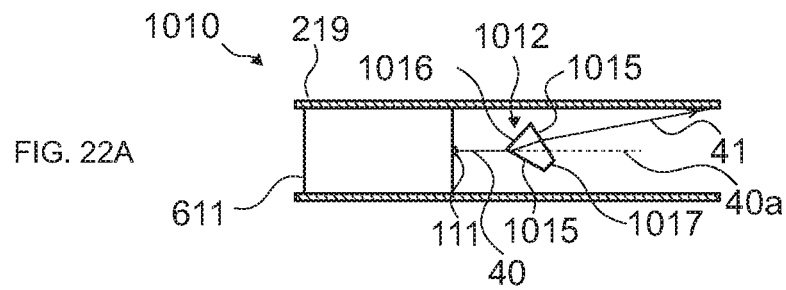
FIGS. 22A and 22B A cross-sectional view showing a modified example of a movable member according to a tenth embodiment.
Figure 22B:
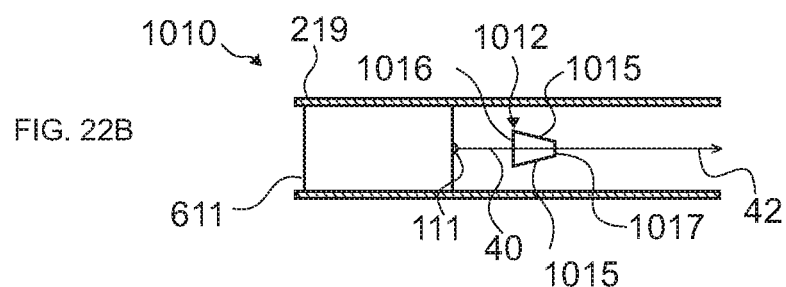

Referring to FIGS. 22A and 22B, an optical communication connector according to a tenth embodiment will be described. FIGS. 22A and 22B are schematic cross-sectional views of an optical communication connector 1010, FIG. 22A shows a state during non-fitting, and FIG. 22B shows a state during fitting.

As shown in FIGS. 22A and 22B, the optical communication connector 1010 includes a first outer wall portion (not shown), a second outer wall portion 219, an optical component 611, a movable member 1012, a rotating mechanism for the movable member (not shown), stoppers (not shown), and a cover member (not shown).

The movable member 1012 has a frustum shape. The movable member 1012 includes a bottom surface 1016 that is an incident surface, an upper surface 1017 that is an emission surface having an area smaller than that of the bottom surface 1016, and side surfaces 1015, the bottom surface 1016 and the upper surface 1017 being arranged in parallel with each other. The movable member 1012 is positioned such that the bottom surface 1016 and the upper surface 1017 are perpendicular to the incident light 40 in the second state.

A case where the optical communication connector 1010 is a sender is shown as an example here. It should be noted that in a case where the optical communication connector 1010 is a receiver, the upper surface 1017 is an incident surface upon which light from the counterpart optical communication connector is incident and the bottom surface 1016 is an emission surface.

As shown in FIG. 22A, the movable member 1012 is positioned such that the optical axis 40a of the incident light 40 is oblique to an extension of the bottom surface 1016 in the first state. In the first state, the incident light 40 from the optical component 611 is obliquely incident upon the side surfaces 1015. The light incident upon the side surfaces 1015 is refracted and is obliquely emitted from the side surfaces 1015.

The optical axis of this light 41 emitted from the movable member 1012 is positioned to be oblique to the optical axis 40a of the incident light 40 and the light 41 emitted from the movable member 1012 travels on an optical path toward an inner side surface of the second outer wall portion 219. Therefore, light from the optical component 611 is prevented from being directly emitted to the outside of the optical communication connector 1010.

On the other hand, as shown in FIG. 22B, the movable member 1012 is positioned such that the bottom surface 1016 and the upper surface 1017 are perpendicular to the optical axis of the incident light 40a in the second state. Accordingly, the incident light 40 from the optical component 611 is perpendicularly incident upon the bottom surface 1016 and is emitted from the upper surface 1017 to be perpendicular to the upper surface 1017. The light 42 passing therethrough is directly emitted to the outside of the optical communication connector 1010 and is incident upon the counterpart connector (not shown).

Eleventh Embodiment

Figure 23A:
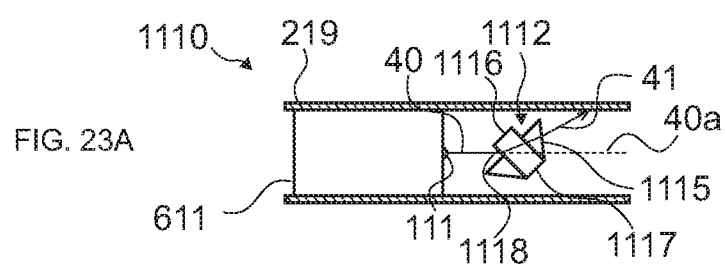
FIGS. 23A and 23B A cross-sectional view showing a modified example of a movable member according to an eleventh embodiment.
Figure 23B:
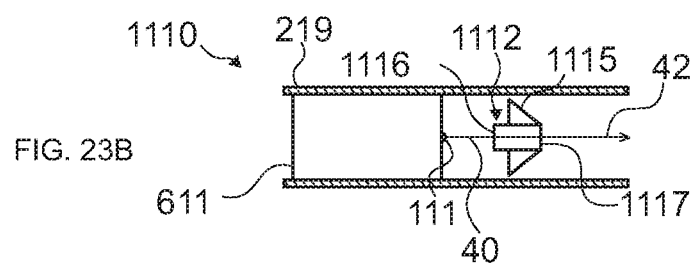

Next, an optical communication connector according to an eleventh embodiment will be described with reference to FIGS. 23A and 23B. FIGS. 23A and 23B are schematic cross-sectional views of an optical communication connector 1110, FIG. 23A shows a state during non-fitting, and FIG. 23B shows a state during fitting.

As shown in FIGS. 23A and 23B, the optical communication connector 1110 includes a first outer wall portion (not shown), a second outer wall portion 219, an optical component 611, a movable member 1112, a rotating mechanism for the movable member (not shown), stoppers (not shown), and a cover member (not shown).

The movable member 1112 has a shape having a convex portion at the center of the bottom surface of the frustum. The movable member 1112 includes a first surface 1116 and a second surface 1117, a side surface 1115 of the frustum portion, and a side surface 1118 of the convex portion, the first surface 1116 and the second surface 1117 being incident surfaces arranged in parallel with each other. The movable member 1112 is positioned such that the first surface 1116 and the second surface 1117 are perpendicular to the incident light 40 in the second state.

As shown in FIG. 23A, the movable member 1112 is positioned such that the optical axis 40a of the incident light 40 is oblique to an extension of the first surface 1116 in the first state. In the first state, the incident light 40 from the optical component 611 is obliquely incident upon the side surface 1118. The light incident upon the side surface 1118 is refracted and is obliquely emitted from the side surface 1115.

The optical axis of this light 41 emitted from the movable member 1112 is positioned to be oblique to the optical axis 40a of the incident light 40 and the light 41 emitted from the movable member 1112 travels on an optical path toward an inner side surface of the second outer wall portion 219. Therefore, incident light from the optical component 611 is prevented from being directly emitted to the outside of the optical communication connector 1110.

On the other hand, as shown in FIG. 23B, the movable member 1112 is positioned such that the first surface 1116 and the second surface 1117 are perpendicular to the optical axis 40a of the incident light 40 in the second state.

Accordingly, the incident light 40 from the optical component 611 is perpendicularly incident upon the first surface 1116 and is emitted to be perpendicular to the second surface 1117 from the second surface 1117. The light 42 passing therethrough is directly emitted to the outside of the optical communication connector 1110 and is incident upon the counterpart connector (not shown).

Twelfth Embodiment

Figure 24A:
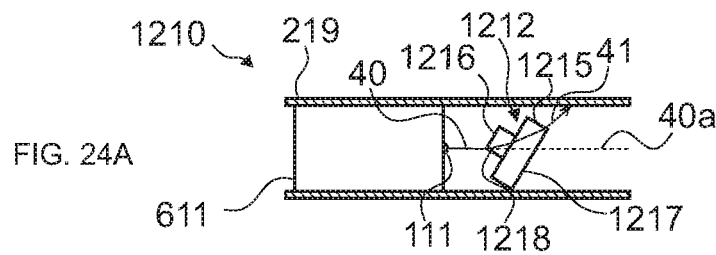
FIGS. 24A and 24B A cross-sectional view showing a modified example of a movable member according to a twelfth embodiment.
Figure 24B:
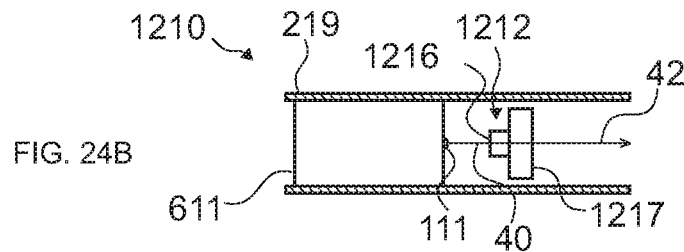

Next, an optical communication connector according to a twelfth embodiment will be described with reference to FIGS. 24A and 24B. FIGS. 24A and 24B are schematic cross-sectional views of an optical communication connector 1210, FIG. 24A shows a state during non-fitting, and FIG. 24B shows a state during fitting.

As shown in FIGS. 24A and 24B, the optical communication connector 1210 includes a first outer wall portion (not shown), a second outer wall portion 219, an optical component 611, a movable member 1212, a rotating mechanism for the movable member (not shown), stoppers (not shown), and a cover member (not shown).

The movable member 1212 is constituted by a shape in which two columns different in size are stacked such that their center axes are on an identical axis. The movable member 1212 includes a first surface 1216 and a second surface 1217 that are incident surfaces arranged in parallel with each other, a side surface 1215 of the bigger column, and a side surface 1218 of the smaller column. The movable member 1212 is positioned such that the first surface 1216 and the second surface 1217 are perpendicular to the incident light 40 in the second state.

As shown in FIG. 24A, the movable member 1212 is positioned such that the optical axis 40a of the incident light 40 is oblique to an extension of the first surface 1216 in the first state. In the first state, the incident light 40 from the optical component 611 is obliquely incident upon the side surface 1218. The light incident upon the side surface 1218 is refracted and is emitted to be oblique to the side surface 1215.

This light 41 emitted from the movable member 1212 is emitted in a direction positioned obliquely to the optical axis 40a of the incident light 40 and travels on an optical path toward an inner side surface of the second outer wall portion 219. Therefore, incident light from the optical component 611 is prevented from being directly emitted to the outside of the optical communication connector 1210.

On the other hand, as shown in FIG. 24B, the movable member 1212 is positioned such that the first surface 1216 and the second surface 1217 are perpendicular to the optical axis 40a of the incident light 40 in the second state. Accordingly, the incident light 40 from the optical component 611 is perpendicularly incident upon the surface of the first surface 1216 and is emitted from the second surface 1217 to be perpendicular to the second surface 1217.

The light 42 passing through the movable member 1212 is directly emitted to the outside of the optical communication connector 1210 and is incident upon the counterpart connector (not shown).

As shown in each of the tenth to twelfth embodiments above, the movable member may be constituted by the prism.

Although the description has been given by exemplifying the simplex-type connector in each of the above-mentioned embodiments, the present technology can also be applied to a multiplex-type connector that outputs collimated light beams in a two-dimensional array form from a collimated output surface.

Hereinafter, modified examples of the shape of the movable member in a case where it is applied to a multiplex-type connector in which eight collimating lenses in total, vertical two and horizontal four collimating lenses, are provided will be described showing thirteenth to sixteenth embodiments as examples. It should be noted that the number of collimating lenses, arrangement of collimating lenses, and the shape of the movable member are not limited to those described here.

Also in each of the thirteenth to sixteenth embodiments, the movable member is configured to take the first state, such that a plurality of light beams from the optical component which are incident upon the movable member are reflected or refracted to change the optical paths and the power of the light beams emitted to the outside is attenuated.

Then, the movable member is configured to take the second state to thereby allow a plurality of incident light beams from the optical component to pass therethrough and directly emit the light beams to the outside of the optical connector. Hereinafter, configurations similar to those of the above-mentioned embodiments will be denoted by similar reference signs and descriptions will be omitted.

Thirteenth Embodiment

Figure 25A:
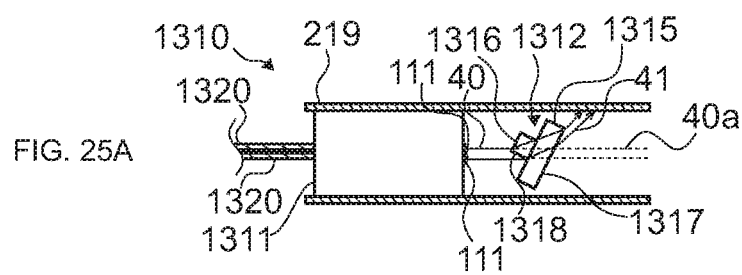
FIGS. 25A and 25B A cross-sectional view showing a modified example of a movable member according to a thirteenth embodiment.
Figure 25B:
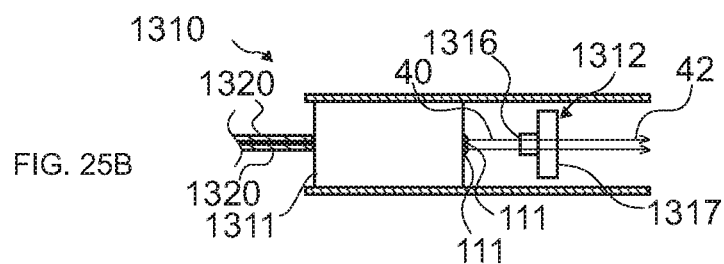

Referring to FIGS. 25A and 25B, an optical communication connector according to a thirteenth embodiment will be described. FIGS. 25A and 25B are schematic cross-sectional views of an optical communication connector 1310, FIG. 25A shows a state during non-fitting, and FIG. 25B shows a state during fitting.

As shown in FIGS. 25A and 25B, the optical communication connector 1310 includes a first outer wall portion (not shown), a second outer wall portion 219, an optical component 1311, a movable member 1312, a rotating mechanism for the movable member (not shown), stoppers (not shown), and a cover member (not shown).

The optical component 1311 includes a plurality of collimating lenses 111, here, eight collimating lenses 111. The optical component 1311 retains optical transmission paths 1320.

The optical component 1311 is provided with an optical transmission path insertion hole (not shown) into which end portions of the plurality of optical transmission paths 1320 are inserted. The end portions of the optical transmission paths are supported through the optical transmission path insertion hole inside the optical component 1311 such that the optical axes of the optical transmission paths and the collimating lenses 111 are aligned with each other.

It should be noted that in the fourteenth to sixteenth embodiments to be described later, the illustration and descriptions of the optical transmission paths 1320 will be omitted.

The movable member 1312 is constituted by a prism. The movable member 1312 is constituted by a shape in which two columns different in size are stacked such that their center axes are on an identical axis. The movable member 1312 includes a first surface 1316 and a second surface 1317 that are incident surfaces arranged in parallel with each other, a side surface 1318 of the smaller column, and a side surface 1315 of the bigger column.

The movable member 1312 is positioned such that the first surface 1316 and the second surface 1317 are perpendicular to the incident light 40 in the second state. A setting is made such that incident light beams 40 from the eight collimating lenses 111 are all incident upon the first surface 1316 of the movable member 1312 in the second state.

As shown in FIG. 25A, the movable member 1312 is positioned such that optical axes 40a of the incident light beams 40 are oblique to an extension of the first surface 1316 in the first state. In the first state, the incident light beams 40 from the optical component 1311 are obliquely incident upon the side surface 1318. The light beams incident upon the side surface 1318 are refracted and emitted from the second surface 1317.

The optical axes of these light beams 41 emitted from the movable member 1312 are positioned to be oblique to the optical axes 40a of the incident light beams 40 and the light beams 41 emitted from the movable member 1312 travel on optical paths toward the inner side surface of the second outer wall portion 219. Therefore, the incident light beams 40 from the optical component 1311 are prevented from being directly emitted to the outside of the optical communication connector 1310.

On the other hand, as shown in FIG. 25B, the movable member 1312 is positioned such that the first surface 1316 and the second surface 1317 are perpendicular to the optical axes 40a of the incident light beams 40 in the second state. Accordingly, the incident light beams 40 from the optical component 1311 are perpendicularly incident upon the surface of the first surface 1316 and are emitted from the second surface 1317 to be perpendicular to the second surface 1317. Light beams 42 passing therethrough are directly emitted to the outside of the optical communication connector 1310 and are incident upon the counterpart connector (not shown).

Fourteenth Embodiment

Figure 26A:
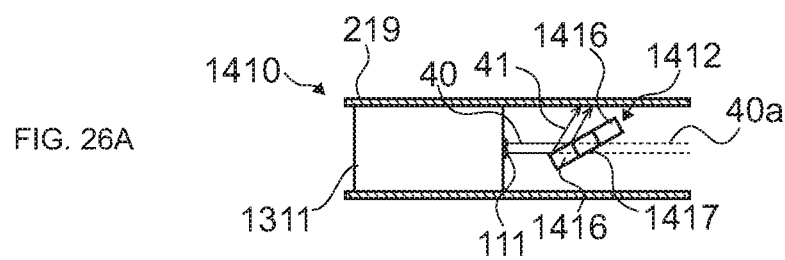
FIGS. 26A and 26B A cross-sectional view showing a modified example of a movable member according to a fourteenth embodiment.
Figure 26B:
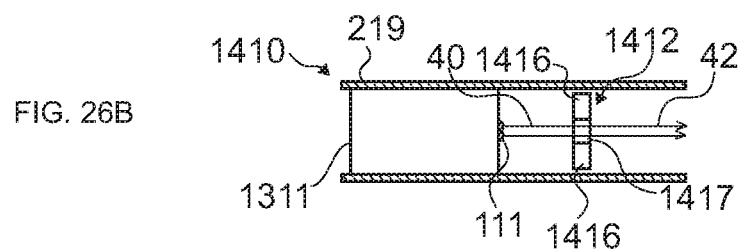

Next, an optical communication connector according to a fourteenth embodiment will be described with reference to FIGS. 26A and 25B. FIGS. 26A and 26B are schematic cross-sectional views of an optical communication connector 1410, FIG. 26A shows a state during non-fitting, and FIG. 26B shows a state during fitting.

As shown in FIGS. 26A and 26B, the optical communication connector 1410 includes a first outer wall portion (not shown), a second outer wall portion 219, an optical component 1311, a movable member 1412, a rotating mechanism for the movable member (not shown), stoppers (not shown), and a cover member (not shown).

The movable member 1412 has a plate shape. The movable member 1412 includes reflective portions 1416 and a transmissive portion 1417 in a flat surface orthogonal to a direction of the thickness. In the figure, the transmissive portion 1417 is located at the center and the reflective portions 1416 are respectively positioned in the upper portion and the lower portion to be opposite to each other while sandwiching this transmissive portion 1417.

The transmissive portion 1417 is constituted by a prism. The transmissive portion 1417 includes an incident surface upon which light is incident and an emission surface from which light is emitted, the incident surface and the emission surface being arranged in parallel to be opposite to each other. Light perpendicularly incident upon the incident surface is refracted and is emitted from the emission surface. A setting is made such that the incident light beams 40 from the eight collimating lenses 111 are all incident upon the incident surface of the transmissive portion 1417.

The reflective portions 1416 each have a surface mirror-finished, for example, to be configured to reflect light on the surface.

As shown in FIG. 26A, the movable member 1412 is positioned such that the flat surface is oblique to optical axes 40a of the incident light beams 40 in the first state. In the first state, the incident light beams 40 from the optical component 1311 are incident upon the reflective portions 1416. Light beams 41 reflected on the reflective portions 1416 travel on optical paths toward an inner side surface of the second outer wall portion 219. Therefore, the incident light beams 40 from the optical component 1311 are prevented from being directly emitted to the outside of the optical communication connector 1410.

On the other hand, as shown in FIG. 26B, the movable member 1412 is positioned such that the flat surface is perpendicular to the optical axis 40a of the incident light 40 in the second state. Accordingly, the incident light beams 40 from the optical component 1311 are perpendicularly incident upon the surface of the transmissive portion 1417, pass through the transmissive portion 1417, and are emitted from the transmissive portion 1417. Light beams 42 passing therethrough are directly emitted to the outside of the optical communication connector 1410 and are incident upon the counterpart connector (not shown).

Fifteenth Embodiment

Next, an optical communication connector according to a fifteenth embodiment will be described with reference to FIGS. 27A and 27B. FIGS. 27A and 27B are schematic cross-sectional views of an optical communication connector 1510, FIG. 27A shows a state during non-fitting, and FIG. 27B shows a state during fitting.

As shown in FIGS. 27A and 27B, the optical communication connector 1510 includes a first outer wall portion (not shown), a second outer wall portion 219, an optical component 1311, a movable member 1512, a rotating mechanism for the movable member (not shown), stoppers (not shown), and a cover member (not shown).

The movable member 1512 has a plate shape. The movable member 1512 includes reflective portions 1516 and transmissive portions 1517a and 1517b in a flat surface orthogonal to a direction of the thickness.

The reflective portions 1516 are provided between the transmissive portion 1517a and the transmissive portion 1517b and on upper and lower sides of these two transmissive portions to sandwich these two transmissive portions 1517a and 1517b.

The movable member 1512 is configured such that when the movable member 1512 is held in the second state, out of eight collimating lenses 111 arranged in two vertical and four horizontal arrays, incident light beams 40 from upper four collimating lenses 111 are incident upon the transmissive portion 1517a and incident light beams 40 from lower four collimating lenses 111 are incident upon the transmissive portion 1517b.

The transmissive portions 1517a and 1517b are each constituted by a prism. The transmissive portions 1517a and 1517b each include an incident surface upon which light is incident and an emission surface from which light is emitted, the incident surface and the emission surface being arranged in parallel to be opposite to each other. Light perpendicularly incident upon the incident surface is refracted and is emitted from the emission surface.

The reflective portions 1516 each have a surface mirror-finished, for example, to be configured to reflect light on the surface.

As shown in FIG. 27A, the movable member 1512 is positioned such that the flat surface is oblique to the optical axis 40*a* of the incident light 40 in the first state. In the first state, light beams 40 from the optical component 1311 are incident upon the reflective portions 1516. Light beams 41 reflected on the reflective portions 1516 travel on optical paths toward an inner side surface of the second outer wall portion 219. Therefore, the incident light beams 40 from the optical component 1311 are prevented from being directly emitted to the outside of the optical communication connector 1510.

On the other hand, as shown in FIG. 27B, the movable member 1512 is positioned such that the flat surface is perpendicular to the optical axis 40*a* of the incident light 40 in the second state. Accordingly, the incident light beams 40 from the optical component 1311 are perpendicularly incident upon surfaces of the transmissive portions 1517*a* and 1517*b*, pass through the transmissive portions 1517*a* and 1517*b*, and are emitted from the transmissive portions 1517*a* and 1517*b*. Light beams 42 passing therethrough are directly emitted to the outside of the optical communication connector 1510 and is incident upon the counterpart connector (not shown).

Sixteenth Embodiment

Next, an optical communication connector according to a sixteenth embodiment will be described with reference to FIGS. 28A and 28B. FIGS. 28A and 28B are schematic cross-sectional view of an optical communication connector 1610, FIG. 28A shows a state during non-fitting, and FIG. 28B shows a state during fitting.

As shown in FIGS. 28A and 28B, the optical communication connector 1610 includes a first outer wall portion (not shown), a second outer wall portion 219, an optical component 1311, a movable member 912, a rotating mechanism for the movable member (not shown), stoppers (not shown), and a cover member (not shown).

The movable member 912 has a configuration similar to that of the movable member 912 shown in the ninth embodiment. A transmissive portion 9122 of the movable member 912 is provided such that incident light beams 40 from the eight collimating lenses 111 are all incident upon the transmissive portion 9122 in the second state.

As shown in FIG. 28A, the movable member 912 is positioned such that the flat surface is oblique to the optical axis 40*a* of the incident light 40 in the first state. In the first state, the incident light beams 40 from the optical component 1311 are incident upon the reflective portions 9121. Light beams 41 reflected on the reflective portions 9121 are travel on optical paths toward an inner side surface of the second outer wall portion 219. Therefore, the light beams from the optical component 1311 are prevented from being directly emitted to the outside of the optical communication connector 1610.

On the other hand, as shown in FIG. 28B, the movable member 912 is positioned such that a surface of the transmissive portion 9122 is perpendicular to the optical axis 40*a* of the incident light 40 in the second state. Accordingly, the incident light beams 40 from the optical component 1311 are perpendicularly incident upon the surface of the transmissive portion 9122 and are emitted from the transmissive portion 9122. Light beams 42 passing through the transmissive portion 9122 are directly emitted to the outside of the optical communication connector 1610 and are incident upon the counterpart connector (not shown).

Seventeenth Embodiment

Although in each of the above-mentioned embodiments, the movable member is configured to be capable of taking the first state and the second state by configuring the movable member to be rotatable, the present technology is not limited thereto. In this embodiment, the movable member is configured to be capable of taking the first state and the second state by configuring the movable member to be movable upward and downward.

Although the upward and downward movement mechanism for the movable member will be mainly described with reference to FIGS. 29 to 31, 30A, 30B, and 31 hereinafter, configurations similar to those of the above-mentioned embodiments will be denoted by similar reference signs and descriptions thereof will be omitted in some cases.

FIG. 29 is a schematic perspective view of one optical communication connector 1710B of the optical communication connector set, which is on the receptacle side, and shows a state in which positioning pins of an optical communication connector on the plug side has been inserted.

Figure 30A:
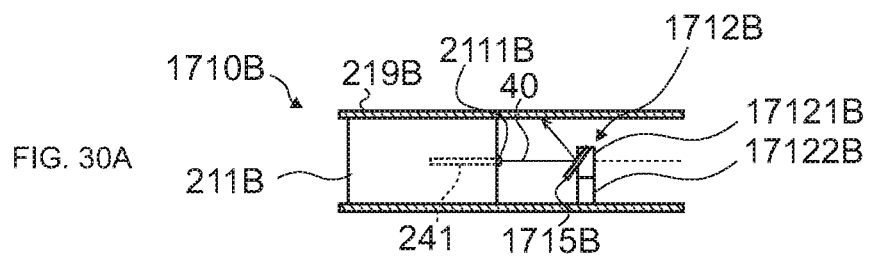
FIGS. 30A and 30B A cross-sectional view showing optical paths of light incident upon the movable member from the optical component during non-fitting and during fitting of the optical communication connector in FIG. 29.
Figure 30B:
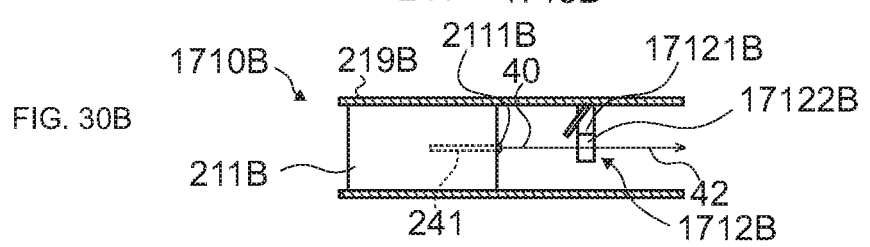
Figure 31:
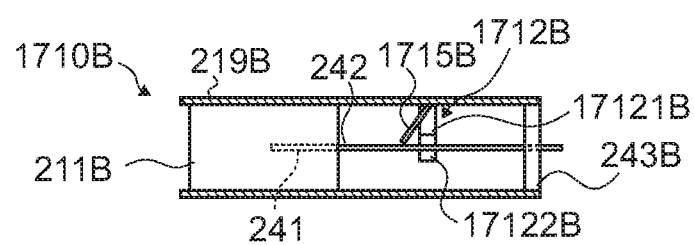
FIG. 31 A cross-sectional view of the optical communication connector in FIG. 29 during fitting.

FIGS. 30A and 30B is are schematic cross-sectional views describing a state of the movable member during non-fitting and during fitting of the optical communication connector 1710B in FIG. 29 and an optical path of light. FIG. 31 is a schematic cross-sectional view for describing the movement mechanism for the movable member when a counterpart optical communication connector (not shown) is fitted to the optical communication connector 1710B in FIG. 29.

Although the illustration of the optical communication connector on the plug side that is the counterpart connector for the optical communication connector 1710B will be omitted here, the optical communication connector 210A equipped with the positioning pins 242 described in the second embodiment can be used for example.

The optical communication connector 1710B includes a first outer wall portion (not shown), a second outer wall portion 219B, an optical component 211B, a movable member 1712B, movement-assisting plates 1715B, and a cover member 243B.

Moreover, the optical communication connector 1710B includes a mechanism (not shown) of limiting the upper and lower movement of the movable member 1712B. The optical communication connector 1710B can include a positioning member for positioning each member, a protection member for protecting each member, a casing for supporting each member, and the like as appropriate besides the above-mentioned configuration.

The first outer wall portion have a configuration similar to that of the first outer wall portion 218A according to the second embodiment.

The optical component 211B includes collimating lens 111B as in the optical component 211B according to the second embodiment. Moreover, the optical component 211B is provided with an optical transmission path insertion hole (not shown) into which an end portion of an optical transmission path 202B is inserted and positioning holes 241 spatially separated from the optical transmission path insertion hole.

The positioning pins 242 provided in the optical communication connector that is the counterpart connector are inserted into the positioning holes 241 during fitting.

The movable member 1712B has a plate shape. The movable member 1712B includes a reflective portion 17121B that is a non-light-transmissive portion and a transmissive portion 17122B in a flat surface orthogonal to a direction of the thickness. The reflective portion 17121B is positioned on the transmissive portion 17122B.

The transmissive portion 17122B is constituted by a light-transmissive member such as a prism and a glass. The transmissive portion 17122B includes an incident surface upon which light is incident and an emission surface from which light is emitted, the incident surface and the emission surface being arranged in parallel to be opposite to each other. Light perpendicularly incident upon the incident surface is refracted and is emitted from the emission surface.

The reflective portion 17121B has a surface mirror-finished, for example, to be configured to reflect light on the surface.

The movable member 1712B is configured to be movable upward and downward. As shown in FIG. 30A, in the first state, the movable member 1712B is located on a lower side inside the second outer wall portion 219B in the figure. As shown in FIG. 30B, in the second state, the movable member 1712B is located on an upper side inside the second outer wall portion 2198.

As shown in FIG. 30A, the movable member 1712B is held in the first state during non-fitting, such that light from the optical component 211B is incident upon the reflective portion 17121B. This incident light 40 is reflected on the reflective portion 17121B and travels on an optical path toward an inner wall of the second outer wall portion 219B, i.e., the inside of the optical communication connector 1710B. Therefore, the incident light 40 from the optical component 211B is prevented from being directly emitted to the outside of the optical communication connector 1710B.

As shown in FIG. 30B, the movable member 1712B is held in the second state during fitting, such that light from the optical component 211B is incident upon the transmissive portion 17122B. This incident light 40 passes through the transmissive portion 17122B and is emitted from the transmissive portion 17122B. This emitted light 42 is directly emitted to the outside of the optical communication connector 1710B and is incident upon the counterpart connector (not shown).

The movement-assisting plates 1715B each have a plate shape and are respectively fixed on both upper side portions of the movable member 1712B to be oblique to the movable member 1712B.

The positioning pins 242 pushes the movement-assisting plates 1715B and moves the movement-assisting plates 1715B upward, such that the movable member 1712B fixed to the movement-assisting plates 1715B moves upward.

Specifically, when the optical communication connector on the plug side is inserted into the optical communication connector 1710B on the receptacle side, the positioning pins 242 are inserted into the through-holes 2431 of the cover member 243B of the optical communication connector 1710B.

In addition, when the positioning pins 242 are inserted, the positioning pins 242 are brought into contact with the lower portion of the movement-assisting plates 1715B and the movement-assisting plates 1715B is lifted and moves upward. Interlocked with this movement of the movement-assisting plates 1715B, the movable member 1712B moves upward. The positioning pins 242 are inserted into the positioning holes 241 and positioning of the optical communication connector 1710B and the counterpart optical communication connector is performed.

With the upper movement of the movable member 1712B, the transmissive portion 17122B of the movable member 1712B moves to a position at which the incident light 40 from the optical component 211B is incident. Light from the optical component 211B is incident upon the transmissive portion 17122B of the movable member 1712B.

It should be noted that in this embodiment, the pin insertion holes are provided in the optical communication connector on the receptacle side and the pins are provided in the optical communication connector on the plug side, though those may be inverted.

As described above, the movable member may be configured to be capable of taking the first state and the second state by configuring the movable member 1712 to be movable upward and downward.

Embodiments of the present technology are not limited to the above-mentioned embodiments and various changes can be made without departing from the gist of the present technology.

For example, in each of the above-mentioned embodiments, the reflective portion is provided by constituting the non-light-transmissive portion of the movable member by the member that reflects light, though the present technology is not limited thereto.

For example, the non-light-transmissive portion may be constituted by a member on which a substance that absorbs light in a wavelength range of communication light, for example, carbon or a light-absorbing pigment is applied or a resin containing a substance such as carbon and a light-absorbing pigment, and it may be used as an absorption portion. Accordingly, light leakage to the outside of the optical communication connector can be suppressed during non-fitting.

Moreover, the non-light-transmissive portion may be constituted by a member having a surface roughened to be capable of scattering light, and it may be used as a scattering portion. Since light is scattered, even if light leaks to the outside of the optical communication connector, the light leaks as scattered light safe for human eyes, not collimated light hazard to human eyes.

Moreover, the portion of the inner wall of the first outer wall portion in the first embodiment or the inner wall of the second outer wall portion in each of the second to seventeenth embodiments, which is irradiated with light reflected on the movable member during non-fitting is constituted by the scattering member and the first or second outer wall portion functions as the scattering portion, though the present technology is not limited thereto.

For example, the portion of the first or second outer wall portion, which is irradiated with light reflected on the movable member during non-fitting, may be constituted by a light-absorbing material and the first or second outer wall portion may function as an absorption portion. The light-absorbing material may be constituted by a member on which a substance that absorbs light in a wavelength range of communication light, for example, carbon or a light-absorbing pigment is applied or a resin containing a substance such as carbon and a light-absorbing pigment. Accordingly, leakage of light to the outside of the optical communication connector can be suppressed during non-fitting.

Moreover, in the above-mentioned optical communication connector set using the pins, the two pin insertion holes are provided in the one optical communication connector and the two pins are provided in the other optical communication connector. In contrast, one pin insertion hole and one pin may be provided in the one optical communication connector and a pin to be inserted into the pin insertion hole of the one optical communication connector and a pin insertion hole into which the pin of the one optical communication connector is to be inserted may be provided in the other optical communication connector.

Moreover, in each of the above-mentioned embodiments, when the movable member is held in the second state, the optical axis of the light which is incident upon the movable member and is emitted from the movable member is aligned with the optical axis of the incident light. In contrast, the movable member may be configured such that when the movable member is held in the second state, the optical axis of the emission light from the movable member is parallel to the optical axis of the incident light, not aligned with the optical axis of the incident light.

In order to provide such a configuration in which the optical axis of the light incident upon the movable member is parallel to the optical axis of the light emitted from the movable member, it is sufficient that for example, the incident surface upon which the incident light of the movable member is incident and the emission surface from which the emission light is emitted made parallel and the movable member is configured such that the incident light is obliquely incident upon the incident surface during fitting.

In this case, for example, in a case where the counterpart connector does not include a member that changes the optical path of light, the light is incident upon the collimating lens of the counterpart connector, the collimating lens being positioned on the optical axis of the emission light from the movable member of the connector. The configuration to switch the optical path by making the optical axis of the incident light and the optical axis of the emission light parallel to each other not aligned with each other in this manner may be employed.

Moreover, in the fourth embodiment in which the electromagnet is used for the rotating mechanism for the movable member, the non-light-transmissive portions of the movable member is the movable magnets. However, a configuration in which the movable magnets are provided in the movable member including the non-light-transmissive portions and the light-transmissive portion or the movable member constituted by the prism, which has been described in the other embodiments, may be employed.

Moreover, although the description has been given by exemplifying the collimated light in each of the above-mentioned embodiments, the present technology is not limited thereto. The present technology can also be applied to diffused or contracted light.

Moreover, in the simplex-type connector using the cover member, a reversible type with which fitting is possible even if the one optical communication connector is inserted upside down when fitting the optical communication connector to the counterpart communication connector can also be provided. The usability is thus enhanced.

Moreover, a single mode may be used or multi-modes may be used as the optical fiber that is an example of the optical transmission path.

It should be noted that the present technology may also take the following configurations.

(1) A connector including:
an optical component that emits light; and
a movable member upon which light from the optical component is incident, the movable member being movable between a first state taken during non-fitting to a counterpart connector and a second state taken during fitting to the counterpart connector, in which
incident light incident upon the movable member from the optical component is, in the first state, attenuated and emitted to an outside such that power of the light is lower than power of the light when the movable member is held in the second state.

(2) The connector according to (1), in which
the movable member includes a non-light-transmissive portion that does not allow the incident light to pass therethrough and a light-transmissive portion that allows the incident light to pass therethrough, the incident light is incident upon the non-light-transmissive portion in the first state, and the incident light is incident upon the light-transmissive portion in the second state.

(3) The connector according to (2), in which
the non-light-transmissive portion reflects the incident light, the connector further including
a scattering portion that scatters at least a part of the light reflected on the non-light-transmissive portion or an absorption portion that absorbs at least a part of the light reflected on the non-light-transmissive portion.

(4) The connector according to (2), in which
the non-light-transmissive portion absorbs the incident light.

(5) The connector according to (2), in which
the non-light-transmissive portion scatters the incident light.

(6) The connector according to (1), in which
the movable member refracts and emits, in the first state, incident light obliquely to the optical axis of the incident light and emits, in the second state, the incident light to be aligned with the optical axis of the incident light or emits the incident light to be parallel to the optical axis of the incident light, the connector further including
a scattering portion that scatters at least a part of the light refracted by the movable member and emitted from the movable member or an absorption portion that absorbs at least a part of the light refracted by the movable member and emitted from the movable member.

(7) The connector according to (6), in which
the movable member has a frustum shape.

(8) The connector according to any one of (1) to (7), further including
an electromagnet that generates magnetic force during fitting to the counterpart connector, and
the movable member includes a movable magnet absorbable to the electromagnet.

(9) The connector according to any one of (1) to (7), in which
the movable member is configured to be rotatable.

(10) The connector according to (9), further including:
a rotation shaft that supports the movable member to be movable between the first state and the second state; and
an urging member that urges the movable member in a direction to move from the second state to the first state.

(11) The connector according to (10), further including:
an elastic member that is fixedly disposed on the optical component and is capable of extending and contracting in an insertion direction of the counterpart connector; and
a pin that is capable of being brought into contact with the movable member and protrudes from the optical component, the pin having a length of protrusion from the optical component, the length of protrusion changing due to extension and contraction of the elastic member.

(12) The connector according to (10), further including:
a hole into which a pin of the counterpart connector is inserted; and
a rotation-assisting plate fixed to the movable member, in which
the rotation-assisting plate is moved and the movable member is moved from the first state to the second state by inserting the pin into the hole.

(13) The connector according to (10), further including:
a pin that is inserted into a hole of the counterpart connector and is movable in an insertion direction; and
a rotation-assisting plate that moves due to insertion of the pin into the hole and causes the movable member to move from the first state to the second state with the movable member interlocked with the movement.

(14) The connector according to (12) or (13), in which the pin is a positioning pin that positions the connector and the counterpart connector.

(15) The connector according to any one of (1) to (7), in which the movable member is configured to be movable upward and downward.

(16) A connector set including:
a connector that includes an optical component that emits light and a movable member upon which light from the optical component is incident, the movable member being movable between a first state and a second state; and
a counterpart connector capable of fitting to the connector, in which
the movable member of the connector takes the first state during non-fitting of the connector to the counterpart connector and takes the second state during fitting and incident light incident upon the movable member from the optical component is, in the first state, attenuated and emitted to an outside of the connector such that power of the light is lower than power of the light when the movable member is held in the second state.

(17) A cable including:
an optical transmission path; and
a connector including a movable member upon which light from the optical transmission path is incident, the movable member being movable between a first state taken during non-junction with a counterpart connector and a second state taken during junction with the counterpart connector, in which incident light incident upon the movable member from the optical transmission path is, in the first state, attenuated and emitted to an outside such that power of the light is lower than power of the light when the movable member is held in the second state.

(18) An electronic apparatus including
a connector including an optical component that emits light and a movable member upon which light from the optical component is incident, the movable member being movable between a first state taken during non-junction with a counterpart connector and a second state taken during junction with the counterpart connector, in which incident light incident upon the movable member from the optical component is, in the first state, attenuated and emitted to an outside such that power of the light is lower than power of the light when the movable member is held in the second state.

REFERENCE SIGNS LIST 10, 210, 310, 410, 510 optical communication connector set (connector set)
10A, 10B, 210A, 210B, 310A, 310B, 410A, 410B, 510A, 510B, 610,
710, 810, 910, 1010, 1110, 1210, 1310, 1410, 1510, 1610, 1710B optical communication connector (connector, counterpart connector)
11A, 11B, 211A, 211B, 311A, 311B, 411A, 411B, 611, 1311 optical component
12A, 12B, 212A, 212B, 512A, 512B, 612, 712, 812, 912, 1012, 1112,
1212, 1312, 1412, 1512, 1712B movable member
13A, 13B movable member-rotating shaft (rotation shaft)
14A, 14B spring (urging member)
18A, 18B first outer wall portion (scattering portion, absorption portion)
219A, 219B, 219 second outer wall portion (scattering portion, absorption portion)
40 incident light
40a optical axis of incident light
41 light reflected, refracted, or scattered by movable member in first state
42 light emitted from movable member in second state
100 electronic apparatus
121A, 121B, 1416, 1516, 2121A, 2121B, 5121A, 5121B, 6121, 7121,
8121, 9121, 17121B reflective portion (non-light-transmissive portion)
122A, 122B, 1417, 1517, 2122A, 2122B, 5122A, 5122B, 6122, 7122,
8122, 9122, 17122B transmissive portion
200 optical communication cable (cable)
201 cable main body
202A, 202B, 1320 optical transmission path
215B, 315A, 315B rotation-assisting plate
241 positioning hole (hole into which pin is inserted)
242 positioning pin (pin)
442A, 442B pin
443A, 443B coil spring (elastic member)
541 electromagnet
5121A, 5121B movable magnet (non-light-transmissive portion)

The invention claimed is:
1. A connector, comprising:
an optical component configured to emit light;
a movable member configured to:
move between a first state and a second state, wherein
the light from the optical component is incident on the movable member,
the first state is taken during non-fitting to a counterpart connector, and
the second state is taken during fitting to the counterpart connector;
refract and emit, in the first state, the incident light obliquely to an optical axis of the incident light, wherein
the incident light on the movable member, in the first state, is attenuated and emitted to an outside such that a power of the incident light is lower than a power of the incident light when the movable member is in the second state; and
emit, in the second state, the incident light to be aligned with the optical axis of the incident light or emit the incident light to be parallel to the optical axis of the incident light; and
one of a scattering portion that scatters at least a part of the refracted and emitted light or an absorption portion that absorbs at least the part of the refracted and emitted light.

2. The connector according to claim 1, wherein the movable member includes:
a non-light-transmissive portion that does not allow the incident light to pass therethrough; and
a light-transmissive portion that allows the incident light to pass therethrough, wherein
the incident light is incident on the non-light-transmissive portion in the first state, and
the incident light is incident on the light-transmissive portion in the second state.

3. The connector according to claim 2, wherein the non-light-transmissive portion reflects the incident light, and one of the scattering portion that scatters at least a part of the light reflected by the non-light-transmissive portion or the absorption portion absorbs at least the part of the light reflected by the non-light-transmissive portion.

4. The connector according to claim 2, wherein the non-light-transmissive portion absorbs the incident light.

5. The connector according to claim 2, wherein the non-light-transmissive portion scatters the incident light.

6. The connector according to claim 2, further comprising an electromagnet configured to generate magnetic force during fitting to the counterpart connector, wherein
the movable member further includes a movable magnet absorbable to the electromagnet.

7. The connector according to claim 2, wherein the movable member is configured to be rotatable.

8. The connector according to claim 7, further comprising:
a rotation shaft that supports the movable member to be movable between the first state and the second state; and
an urging member that urges the movable member in a direction to move from the second state to the first state.

9. The connector according to claim 8, further comprising:
an elastic member that is fixedly on the optical component, wherein the elastic member is configured to extend and contract in an insertion direction of the counterpart connector; and
a pin configured to:
contact with the movable member; and
protrude from the optical component, wherein
the pin has a length of protrusion from the optical component,
the length of protrusion changes based on the extension and the contraction of the elastic member.

10. The connector according to claim 8, further comprising:
a hole into which a pin of the counterpart connector is inserted; and
a rotation-assisting plate fixed to the movable member, wherein
the rotation-assisting plate is configured to move, and the movable member is moved from the first state to the second state by the insertion of the pin into the hole.

11. The connector according to claim 10, wherein the pin is a positioning pin configured to position the connector and the counterpart connector.

12. The connector according to claim 8, further comprising:
a pin configured to:
insert into a hole of the counterpart connector; and
move in an insertion direction; and
a rotation-assisting plate configured to:
move based on the insertion of the pin into the hole; and
move the movable member from the first state to the second state, wherein
the movable member is interlocked with the movement of the rotation-assisting plate.

13. The connector according to claim 2, wherein the movable member is configured to move upward and downward.

14. The connector according to claim 1, wherein the movable member has a frustum shape.

15. A connector, comprising:
an optical component configured to emit light;
a movable member configured to move between a first state and a second state, wherein
the light from the optical component is incident on the movable member,
the movable member includes:
a non-light-transmissive portion that:
does not allow the incident light to pass therethrough; and
reflects the incident light; and
a light-transmissive portion that allows the incident light to pass therethrough, wherein
the incident light is incident on the non-light-transmissive portion in the first state, and
the incident light is incident on the light-transmissive portion in the second state,
the first state is taken during non-fitting to a counterpart connector,
the second state is taken during fitting to the counterpart connector, and
the incident light on the movable member, in the first state, is attenuated and emitted to an outside such that a power of the incident light is lower than a power of the incident light when the movable member is in the second state; and
one of a scattering portion that scatters at least a part of the light reflected by the non-light-transmissive portion or an absorption portion that absorbs at least the part of the light reflected by the non-light-transmissive portion.

* * * * *